US008935019B2

(12) United States Patent
Swanson et al.

(10) Patent No.: US 8,935,019 B2
(45) Date of Patent: Jan. 13, 2015

(54) APPARATUS AND METHOD FOR POWER PRODUCTION, CONTROL, AND/OR TELEMATICS, SUITABLE FOR USE WITH LOCOMOTIVES

(75) Inventors: David Scott Swanson, Missoula, MT (US); Brian Andrew Bertlin, Mercer Island, WA (US); Donald Edward Shipper, Tacoma, WA (US); Eric Munson, Yelm, WA (US); Jerome Lee Mullins, Kingston, WA (US)

(73) Assignee: Sygnet Rail Technologies, LLC, Tenino, WA (US)

( * ) Notice: Subject to any disclaimer, the term of this patent is extended or adjusted under 35 U.S.C. 154(b) by 0 days.

(21) Appl. No.: 13/592,775

(22) Filed: Aug. 23, 2012

(65) Prior Publication Data
US 2013/0079959 A1     Mar. 28, 2013

Related U.S. Application Data

(60) Provisional application No. 61/526,598, filed on Aug. 23, 2011.

(51) Int. Cl.
*B60W 20/00*     (2006.01)
*B61C 17/00*     (2006.01)

(52) U.S. Cl.
CPC ............... *B60W 20/00* (2013.01); *Y10S 903/93* (2013.01); *B61C 17/00* (2013.01)
USPC ............................................ 701/19; 903/930

(58) Field of Classification Search
USPC ........................................................ 701/19
See application file for complete search history.

(56) References Cited

U.S. PATENT DOCUMENTS

| 6,725,134 | B2 | 4/2004 | Dillen et al. |
| 6,812,656 | B2 * | 11/2004 | Donnelly et al. ............... 318/66 |
| 6,984,946 | B2 * | 1/2006 | Donnelly et al. ............. 318/139 |
| 7,042,190 | B2 * | 5/2006 | Yaguchi et al. .......... 318/400.13 |
| 7,304,445 | B2 * | 12/2007 | Donnelly ....................... 318/108 |
| 7,518,254 | B2 * | 4/2009 | Donnelly et al. ........... 290/40 C |
| 7,565,867 | B2 * | 7/2009 | Donnelly et al. ............ 105/62.1 |

(Continued)

OTHER PUBLICATIONS

International Search Report for Corresponding International Patent Application No. PCT/US2012/052017, mailed Jan. 23, 2013, 5 pages.

(Continued)

*Primary Examiner* — Thomas Tarcza
*Assistant Examiner* — Alex C Dunn
(74) *Attorney, Agent, or Firm* — Seed IP Law Group PLLC

(57) ABSTRACT

A power system housed in modules or containers may be located as a unitary structure for example secured to a locomotive platform, allowing easy retrofits. A control subsystem may maintain an RPM of a prime mover at minimum that still provides an expected level of power from an electric machine for any one of a finite number of throttle settings. The control subsystem may dynamically adjust loads between various combinations of series and/or parallel couplings. A set of processor executable instructions may be configured for specific platforms by selecting appropriate set of values based on number of loads (e.g., driven axles), rating (e.g., horse power), other criteria (e.g., manufacturer, model, year). Characteristics may be determined and verified, and operation based on the outcome of such. A telematics system method logs and provides remote access to operational data, engine data, power system data, anti-idling overrides, unauthorized changes, and/or location.

42 Claims, 17 Drawing Sheets

(56) References Cited

U.S. PATENT DOCUMENTS

| | | |
|---|---|---|
| 7,715,958 B2 * | 5/2010 | Kumar ............................. 701/22 |
| 7,906,862 B2 * | 3/2011 | Donnelly et al. ................. 290/6 |
| 8,154,231 B2 * | 4/2012 | Komatsu et al. ......... 318/400.06 |
| 8,188,692 B2 * | 5/2012 | Kumar ........................... 318/376 |
| 2004/0145187 A1 | 7/2004 | Dillen et al. |
| 2005/0264245 A1 * | 12/2005 | Donnelly ...................... 318/139 |
| 2008/0201019 A1 | 8/2008 | Kumar et al. |
| 2008/0211434 A1 | 9/2008 | Daum et al. |
| 2010/0131128 A1 | 5/2010 | Kalyanam et al. |
| 2010/0235070 A1 * | 9/2010 | Amano ........................ 701/103 |

OTHER PUBLICATIONS

Written Opinion for International Patent Application No. PCT/US2012/052017, mailed Jan. 23, 2013, 6 pages.

* cited by examiner

APPARATUS AND METHOD FOR POWER PRODUCTION, CONTROL, AND/OR TELEMATICS, SUITABLE FOR USE WITH LOCOMOTIVES

CROSS-REFERENCE TO RELATED APPLICATIONS

This application claims benefit under 35 U.S.C. 119(e) from U.S. provisional patent application Ser. No. 61/526,598, filed on Aug. 23, 2011, which is incorporated herein by reference in its entirety.

BACKGROUND

1. Technical Field

The present disclosure generally relates to the field of power production and control of same, as well as telematics, and is particularly suited for use in locomotives, for example as a retrofit to the same, as well as for other transportation and non-transportation uses.

2. Description of the Related Art

Diesel electric locomotives use engines as prime movers to drive traction alternators. These alternators generate AC and rectified to DC power which is directed to drive motors attached to the axles of the rail mounted vehicle (i.e., locomotive). The drive motors, also referred to as traction motors, are geared directly to the axles, and the rotation of the drive motors provides the force necessary for traction.

Locomotives are configured and designated by the number of powered drive axles they were manufactured with. The number of drive motors is a designation used by US and International locomotive manufacturers. For example, locomotives built in the US by General Electric (GE) are divided into two classes, a "C" class, which has 6 powered drive axles, and a "B" class, which has 4 powered drive axles. Electro-Motive Division of General Motors (EMD) has also produced a number of different horsepower models of locomotives, all of which are divided into 6 axle Special Duty(SD) models or 4 axle General Purpose(GP) models. Internationally models are all listed as either 6 axle CO-CO models, or 4 axle BO-BO models. The model designation is also associated with a respective distinct wiring and control system to accommodate the number of drive axles in the design. Control system and wiring schematics are not interchangeable across the model ranges of locomotives, even those of a common manufacturer.

Traditionally, locomotive repower systems are purpose built to the number of drive motors in the locomotive platform. Even if the original engines or alternators are replaced in kind, upgraded or modified, such replacements, upgrades or modifications are purpose built to the specific locomotive platform.

Control systems have been designed to allow a man-machine interface to operate a locomotive directionally, provide throttle and braking commands, and pass these commands to other locomotives when used in duplicity (i.e., consist). The operator initiates a command that is relayed though electrical relay logic, or on later model locomotives via microprocessor commands, to cause the traction alternator to generate power. The prime mover or engine responds to the throttle command causing the alternator or generator to create energy by increasing power (RPM's) or, alternatively, slowing down and reducing the power, according to the operators command.

Locomotives are designed using an eight step throttle scheme (called notches in the United States). Nearly all locomotives employ this eight notch power system when operating in the throttle setting. The throttle is divided into eight distinct power settings, notch one through eight not inclusive of idle. Each of the throttle settings has a horsepower assignment, which varies by model, available horsepower and other criteria established by the manufacturer or owner. If the operator moves the throttle from idle to notch one, the engine speed (i.e., revolutions per minute or RPM) increases to the manufacturers specified RPM, driving the generator or alternator to produce a specified level of energy. Moving the throttle up through the notches causes the engine speed or RPM to change, "generating" more energy to deliver to the drive motors.

Locomotives typically employ two types of braking, a primary braking function achieved via air brakes (i.e., pneumatic braking) and a secondary braking function achieved via dynamic braking. The braking setting for dynamic braking is distinct from the throttle setting, and in contrast thereto, is more of a rheostatic braking command.

The control system monitors the drive motors based on the following criteria: Generator Output=Traction Motor Input. Thus, the number of drive motors is intrinsic to the overall design and operation of the control system. The delivery of energy to traction motors is controlled via the control system which increases or decreases alternator/generator output accordingly.

In summary, on known locomotive or rail mounted vehicles, each locomotive is built using a standard throttle notch horsepower setting, and that horsepower is delivered to the exact number of drive motors for which the control system was designed to monitor, either through relay logic or by a microprocessor. The control system will only function for the model intended.

BRIEF SUMMARY

There have been many repower systems over the years to change, upgrade, or increase power and efficiency. Applicants are unaware of any that have been universal, all being designed and purpose built to accommodate a specific drive axle (model) and/or horsepower configuration. There are two design considerations necessary to correctly address the model of locomotive being powered or repowered. First, the number of drive motors dictates the number of traction motor power switching components to operate them in forward and reverse. As the locomotives must travel in either direction, the drive motors must be capable of rotation and counter-rotation against the geared axles. Second, the locomotive control system must take the operator's commands and signal equipment to provide direction, power, and braking effort. The control system design is specific to the number of powered axles, as are the wiring systems, the number of power contactors, the number of traction motor power switching components, and the electrical system cabling and harness configuration. Many of these approaches may be employed in systems other than locomotives, and even in non-transportation related systems and environments.

The control system is able to transmit signals to create propulsion as the control system is specifically designed, based on the number of powered axles. If there is a discrepancy in the number of powered axles that respond, a conventional system assumes there is a problem, reverts to a failsafe mode and stops the locomotive through signaling an alarm. New approaches to replacing, upgrading or modifying systems which employ a throttle with a finite number of positions, for example locomotives, are desirable. Further, new approaches for increasing fuel economy and reducing pollution from systems employing one or more prime movers and one or more electric machines driven by the prime mover(s) is desirable. Further, new approaches to signaling, collecting data, and providing performance information are desirable.

A power system is described, housed in one or more modules or containers, which may be located as a unitary structure where desired. Such may, for example, be secured to a locomotive platform or carriage. This may allow locomotives to be quickly and easily retrofitted, extending the working life of the locomotive platform. The power system may be employed in other situations and environments, and may be of a size and weight that is easily airlifted using conventional cargo planes, or shipped using conventional forms of conveyance (e.g., container ships, trucks, trains).

Also described is a power system and method of operating the same, including a prime mover (e.g., internal combustion engine) and an electric machine (e.g., generator, alternator) driven by the prime mover, traction motor power switching components to switch electrical power, and a control subsystem. The control subsystem may control the various other components such that a rotational speed of the prime mover is maintained at minimum that still provides an adequate level of power out of the electric machine for any given throttle setting. Such may be particularly advantageous in environments which employ a finite number of discrete or distinct throttle settings, for example a locomotive. The control subsystem may also dynamically adjust a number of traction motors or loads between various combinations of series and/or parallel electrical couplings to provide a desired level of performance across a variety of speeds and/or available levels of power. Such may be particularly advantageous in environments where relatively large amounts of torque are desired at start up or low speeds, but are not necessary at high speeds, for example in operating a locomotive.

Also described is a system and method of operating the same, which employs a set of processor executable instructions, and one of a plurality of sets of values for variables or parameters which allow dynamic configuration based on some input. The sets of values may be stored as part of a logic table. The set of instructions may be selected based on the number of loads to be powered (e.g., number of driven axles or traction motors present), size of the loads (e.g., rated horse power of traction motors), or other criteria (e.g., manufacturer, model, year). Such may allow a module or container housed power system to be retrofitted to existing equipment, without the need to write, maintain or load a specific set of processor executable instructions for each different type of equipment. Such may advantageously allow retrofitting different types of locomotives with a common power system, simply relying on choice of the appropriate set of values to correctly configure the system for operation on a given locomotive platform.

Also described is a system and method for determining characteristics of a platform, or verifying entered characteristics with sensed characteristics. For example, a total number of driven axles on a vehicle (e.g., locomotive platform) may be sensed. Such may be used to verify an expected number of axles. Likewise, rated horse power may be verified between that entered by an operator and an expected value. The characteristics may allow selection of an appropriate set of values to configure operation for the specific vehicle. Verification may be required in order to allow operation at full rated characteristics (e.g., power). Such may be enforced with a software key. A "limp home" mode may be provided, where characteristics cannot be verified, allowing limited operation.

Further described is a telematics system and related methods of operation. Such may collect or log data regarding various systems, subsystems and components, and make the data available remotely. For example, data may be collected on a locomotive and may be available at locations not onboard the locomotive. Such may allow access to data handled by a controller of a power system, such as a retrofitted power system. Such may allow access to data handled by an existing engine control unit. Such may even allow remote diagnostics, maintenance, and even control. Data may include operational data, engine data, power system data, overrides of idle limiting functions, unauthorized changes to the control system, and/or geographic location data. Such may be logically associated with location data, based, for example, on GPS or triangulation (e.g., with respect to cellular base stations).

While generally discussed in the environment of locomotives, the various teachings herein can be applied to other environments, including non-vehicular environments.

A system may be summarized as including a combustion engine operable to produce movement, the movement represented by a value of an operational parameter of the combustion engine; an electric machine having at least one portion coupled to the combustion engine to be driven in response to the movement produced by the combustion engine and to produce electrical power in response; and a control subsystem communicatively coupled to control the combustion engine and the electric machine at least in part in response to a plurality of received throttle input signals that are indicative of a finite number of distinct throttle settings, each of the throttle settings associated with a respective range of available horse power delivered as electrical power via the electric machine, wherein the control subsystem in response to an adjustment in the throttle setting selectively maintains the value of the operational parameter of the combustion engine where an amount of horsepower associated with the adjusted throttle setting is available without a change in the value of the operational parameter of the combustion engine, and selectively changes the value of the operational parameter of the combustion engine where the amount of horsepower associated with the adjusted throttle setting is not available without the change in the value of the operational parameter of the combustion engine. The control subsystem may determine if the electric machine is capable of providing the amount of horsepower associated with the adjusted throttle setting without the change in the value of the operational parameter of the combustion engine.

The system may further include a set of traction motor power switching components electrically coupled to the electric machine to receive electrical power therefrom and communicatively coupled to the control subsystem, the set of traction motor power switching components selectively operable at least in part in response to the control subsystem to switch the electrical power. The control subsystem may monitor the electrical power passing through the traction motor power switching components and may determine if the electric machine is capable of providing the amount of horsepower associated with the adjusted throttle setting without the change in the value of the operational parameter of the combustion engine based on the monitored electrical power passing through the traction motor power switching components. The control subsystem may adjust an excitement of at least one winding of the electric machine if the electric machine is capable of providing the horsepower associated with the adjusted throttle setting without the change in the value of the operational parameter of the combustion engine. The combustion engine may be a diesel combustion engine, the operational parameter may be rotational speed of a crankshaft of the combustion engine, and the electric machine may include at least one of an alternator or a generator.

The control subsystem including at least one processor and at least one non-transitory processor-readable medium that stores instructions and data executable by the processor, the data including a set of values for six driven axles and a set of values for four driven axles, may further include a set of traction motor power switching components electrically coupled to the electric machine to receive electrical power therefrom and communicatively coupled to the control subsystem, the set of traction motor power switching components selectively operable at least in part in response to the control subsystem to switch the electrical power to a plurality of traction motors of a locomotive.

A method of operating a system including a combustion engine operable to produce movement represented by a value of an operational parameter of the combustion engine, an electric machine having at least one portion coupled to the combustion engine to be driven in response to the movement produced by the combustion engine and to produce electrical power in response, and a control subsystem including at least one processor and at least one non-transitory processor-readable medium that stores instructions and data executable by the processor, the control subsystem communicatively coupled to control the combustion engine and the electric machine, may be summarized as including receiving by the control subsystem a plurality of throttle input signals that are indicative of a finite number of distinct throttle settings, each of the throttle settings associated with a respective range of available horse power delivered as electrical power via the electric machine; and in response to an adjustment in the throttle setting, selectively maintaining by the control subsystem the value of the operational parameter of the combustion engine where an amount of horsepower associated with the adjusted throttle setting is available without a change in the value of the operational parameter of the combustion engine The method may further include in response to the adjustment in the throttle setting, selectively changing by the control subsystem the value of the operational parameter of the combustion engine where the amount of horsepower associated with the adjusted throttle setting is not available without the change in the value of the operational parameter of the combustion engine.

The method may further include determining by the control subsystem if the electric machine is capable of providing the amount of horsepower associated with the adjusted throttle setting without the change in the value of the operational parameter of the combustion engine. The method, wherein the system further comprises a set of traction motor power switching components electrically coupled to the electric machine to receive electrical power therefrom and communicatively coupled to the control subsystem, may further include monitoring by the control subsystem the electrical power passing through the traction motor power switching components and wherein the determining if the electric machine is capable of providing the amount of horsepower associated with the adjusted throttle setting without the change in the value of the operational parameter of the combustion engine is based at least in part on the monitored electrical power passing through the traction motor power switching components.

The method may further include adjusting by the control subsystem an excitement of at least one winding of the electric machine if the electric machine is capable of providing the amount of horsepower associated with the adjusted throttle setting without the change in the value of the operational parameter of the combustion engine. The combustion engine may a diesel combustion engine, the operational parameter may be rotational speed, and adjusting by the control subsystem an excitement of at least one winding of the electric machine may include adjusting an excitement of a winding of at least one of an alternator or a generator.

The method, wherein at least one non-transitory processor-readable medium that stores instructions and data executable by the processor, the data including at least a set of values for six driven axles and a set of values for four driven axles, may further include selecting one of the sets of values based on a number of driven axles on a locomotive; and executing the set of instructions using the selected set of values to power to a plurality of traction motors of the locomotive.

A power system for a locomotive having a plurality of traction motors coupled to drive a number of driven axles may be summarized as including a combustion engine operable to produce rotation of a crank shaft at a plurality of rotational speeds representable in revolutions per minute; at least one of an alternator or a generator having at least one drive shaft coupled to the crank shaft of the combustion engine to be driven therewith and to produce electrical power in response thereto at an output of the alternator or the generator; a set of traction motor power switching components electrically coupled to the output of the alternator or the generator and having at least one set of contacts electrically coupled to the traction motors of the locomotive; and a control subsystem communicatively coupled to control the combustion engine, the electric machine, and the traction motor power switching components at least in part in response to a plurality of received throttle input signals that are indicative of a finite number of distinct throttle settings, each of the throttle settings associated with a respective range of available horse power delivered as electrical power to the traction motors via the electric machine and traction motor power switching components, where in response to a selection of a new one of the throttle settings, the control subsystem determines whether at the current rotational speed of the crank shaft the combustion engine and the electrical power that is generatable is within the respective range of available horse power for the selected new one of the throttle settings and changes the rotational speed of the crank shaft of the combustion engine only when the available horse power generatable at the current rotational speed is outside the respective range for the selected new one of the throttle settings. The control subsystem may adjust an excitement of at least one winding of the alternator or generator if at the current rotational speed of the crank shaft of the combustion engine electrical power that is generatable is within the respective range of available horse power for the selected new one of the throttle settings.

A power system for a locomotive platform having a plurality of traction motors coupled to drive a number of driven axles may be summarized as including a combustion engine operable to produce rotation of a crank shaft; at least one of electric machine having at least one drive shaft coupled to the crank shaft of the combustion engine to be driven therewith and to produce electrical power in response thereto at an output of the at least one electric machine; a set of traction motor power switching components electrically coupled to the output of the electric machine and having at least one set of contacts electrically coupleable to the traction motors of the locomotive platform; and a control subsystem comprising at least one processor and at least one non-transitory processor-readable medium that stores instructions and data executable by the processor, the data including a first set of values to drive a first number of traction motors drivingly coupled to six driven axles and at least a second set of values to drive a second number of traction motors drivingly coupled to four driven axles, the control subsystem communicatively coupled to control the combustion engine, at least one electric machine, and the traction motor power switching components at least in part in response to a plurality of received throttle input signals that are indicative of a finite number of distinct throttle settings, each of the throttle settings associated with a respective range of available horse power delivered as electrical power to the traction motors via the at least one electric machine and the traction motor power switching components based at least in part on the number of driven axles of the locomotive platform. The control subsystem may determine the number of driven axles on the locomotive platform. The control subsystem may sense a respective circuit condition on each of a number of circuit paths of the traction motor power switching components and may determine the number of driven axles on the locomotive platform based at least in part on the sensed circuit conditions. The control subsystem may compare the number of driven axles determined by sensing with an expected number of driven axles and may produce a notification if the number of driven axles determined by sensing does not match the expected number of driven axles. The control subsystem may account for any cut out of traction motors when the control subsystem compares the number of driven axles determined by sensing with the expected number of driven axles.

The system may further include an external communications module operable to provide communications externally from the system, wherein the control subsystem causes the external communications module to transmit a signal indicative of the number of driven axles determined by sensing. In response to the transmission of the signal indicative of the number of driven axles determined by sensing, the communications module may receive a response indicative of a match between the number of driven axles determined by sensing and the expected number of driven axles and which may include a key required to operate the system to supply electrical power to the traction motors. The control subsystem may be communicatively coupled to adjust an excitement of at least one winding of the at least one electric machine. The combustion engine may be a diesel combustion engine, and the electric machine may include at least one of an alternator or a generator. The system may receive configuration information from a remote source (e.g., central controller or back-end system), via a gateway communications module. Alternatively, the system may receive a configuration table directly, for example from a directly attached personal computer.

The system may further include a container that houses the combustion engine, the at least one electric machine, the set of traction motor power switching components, and the control subsystem, the container selectively attachable and detachable to the locomotive carriage as an integral unit. The container may be selectively installable on any of at least two locomotive carriages manufactured by respective original equipment manufacturers and the control system may be operable on those respective locomotive carriages without any changes to the instructions via dynamic selection between the first and at least the second sets of variables. The container may be selectively installable on any of at least two locomotive carriages manufactured by a single original equipment manufacturers and the control system may be operable on those respective locomotive carriages without any changes to the instructions. The at least one non-transitory processor-readable medium may store a single set of instructions to control at least two different locomotive platforms which are at least one a) manufactured by respective original equipment manufacturers different from one another or b) have a respective number of driven axles different from one another, based on a dynamic selection between the first and at least the second sets of values and without any changes to the instructions. The traction motor power switching components may be operable to selectively switch ones of the traction motors between series and parallel electrical couplings. Thus, a given container may be installed on one locomotive of a first type in a first instance or time, then on another locomotive of a second type in a second instance or time.

A method of operating a power system for a locomotive platform having a plurality of traction motors coupled to drive a number of driven axles, the power system comprising a combustion engine operable to produce rotation of a crank shaft, at least one electric machine having at least one drive shaft coupled to the crank shaft of the combustion engine to be driven therewith and to produce electrical power in response thereto at an output of the at least one electric machine, a set of traction motor power switching components electrically coupled to the output of the electric machine and having at least one set of contacts electrically coupleable to the traction motors of the locomotive platform, and a control subsystem comprising at least one processor and at least one non-transitory processor-readable medium that stores instructions and data executable by the at least one processor, the data including a first set of values to drive a first number of traction motors drivingly coupled to six driven axles and at least a second set of values to drive a second number of traction motors drivingly coupled to four driven axles, the control subsystem communicatively coupled to control the combustion engine, the at least one electric machine, and the traction motor power switching components may be summarized as including determining by the control subsystem the number of driven axles on the locomotive platform; selecting by the control subsystem between the first or the at least second set of values based at least on the number of driven axles the locomotive platform is determined to have; and executing the instructions by the control subsystem with the selected one of the first or at least the second sets of values.

The method may further include sensing a respective circuit condition on each of a number of circuit paths of the traction motor power switching components, wherein determining the number of driven axles on the locomotive platform is based at least in part on the sensed circuit conditions.

The method may further include comparing the number of driven axles determined by sensing with an expected number of driven axles; and producing a notification if the number of driven axles determined by sensing does not match the expected number of driven axles.

The method may further include accounting for any operator-imposed cut out of traction motors when comparing the number of driven axles determined by sensing with the expected number of driven axles.

The method may further include causing an external communications module to transmit a signal indicative of the number of driven axles determined by sensing externally from the locomotive platform.

The method may further include in response to transmitting the signal indicative of the number of driven axles determined by sensing, receiving a response indicative of a match between the number of driven axles determined by sensing and the expected number of driven axles and which includes a key required to operate the power system to supply electrical power to the traction motors.

The method may further include adjusting an excitement of at least one winding of the at least one electric machine by the control subsystem.

The method may further include selectively detachably attaching a container that houses the combustion engine, the at least one electric machine, the set of traction motor power switching components, and the control subsystem, as an integral unit to the locomotive platform.

The method may further include selectively switching ones of the traction motors between series and parallel electrical couplings by the switchgear in response to the control subsystem.

The method may further include receiving a plurality of received throttle input signals that are indicative of a finite number of distinct throttle settings by the control subsystem, each of the throttle settings associated with a respective range of available horse power delivered as electrical power to the traction motors via the at least one electric machine and the traction motor power switching components based at least in part on the number of driven axles which the locomotive platform has.

A power system for a locomotive platform having a plurality of traction motors coupled to drive a number of driven axles may be summarized as including a combustion engine operable to produce rotation of a crank shaft at a plurality of rotational speeds; at least one of electric machine having at least one drive shaft coupled to the crank shaft of the combustion engine to be driven therewith and to produce electrical power in response thereto at an output of the electric machine; a set of traction motor power switching components electrically coupled to the output of the electric machine and having at least one set of contacts electrically coupled to the traction motors of the locomotive platform; and a control subsystem comprising at least one processor and at least one non-transitory processor-readable medium that stores instructions and data executable by the processor, the control subsystem determining the number of driven axles on the locomotive platform based at least in part on a respective circuit condition sensed on each of a number of circuit paths of the traction motor power switching components. The data may include a first set of values to drive a first number of traction motors drivingly coupled to first number of driven axles and at least a second set of values to drive a second number of traction motors drivingly coupled to a second number of driven axles, the second number of driven axles different than the first number of driven axles, and the control subsystem may select between the first and at least the second set of values based at least in part on the number of driven axles which the locomotive platform is determined to have.

A power system for a locomotive platform having a plurality of traction motors coupled to drive a number of driven axles may be summarized as including a combustion engine operable to produce rotation of a crank shaft at a plurality of rotational speeds; at least one of electric machine having at least one drive shaft coupled to the crank shaft of the combustion engine to be driven therewith and to produce electrical power in response thereto at an output of the electric machine; a set of traction motor power switching components electrically coupled to the output of the electric machine and having at least one set of contacts electrically coupled to the traction motors of the locomotive platform; and a control subsystem comprising at least one processor and at least one non-transitory processor-readable medium that stores instructions and data executable by the processor, the control subsystem coupled to receive an input indicative of a user-entered horse power rating of the traction motors of the locomotive platform, to confirm that the user-entered horse power rating is within a defined threshold of an expected horse power rating of the locomotive platform; and produce a notification if the user-entered horse power rating is not within the defined threshold of the expected horse power rating of the locomotive platform.

The power system may further include an external communications module operable to provide communications externally from the system, and wherein the control subsystem causes the external communications module to transmit a signal indicative of the user-entered horse power rating. In response to transmission of the signal indicative of the user-entered horse power rating, the control subsystem may receive a response indicative of whether the user-entered horse power rating is within the defined threshold of the expected horse power rating of the locomotive platform and which may include a key required to operate the system to supply electrical power to the traction motors. The control subsystem may limit a supply of power to the traction motors if the user-entered horse power rating is not within the defined threshold of the expected horse power rating of the locomotive platform. The control subsystem may cause a message or other alert to be provided via at least one of a visual indicator (e.g., display or indicator light) or aural indicator (e.g., speaker) and may cause a transmission of a message externally from the locomotive platform to produce the notification.

A method of operating a power system for a locomotive platform having a plurality of traction motors coupled to drive a number of driven axles, the power system comprising a combustion engine operable to produce rotation of a crank shaft at a plurality of rotational speeds, at least one electric machine having at least one drive shaft coupled to the crank shaft of the combustion engine to be driven therewith and to produce electrical power in response thereto at an output of the electric machine, a set of traction motor power switching components electrically coupled to the output of the electric machine and having at least one set of contacts electrically coupled to the traction motors of the locomotive platform, and a control subsystem comprising at least one processor and at least one non-transitory processor-readable medium that stores instructions and data executable by the processor may be summarized as including receiving by the control subsystem an input indicative of a user-entered horse power rating of the traction motors of the locomotive platform; confirming that the user-entered horse power rating is within a defined threshold of an expected horse power rating of the locomotive platform; and producing a notification if the user-entered horse power rating is not within the defined threshold of the expected horse power rating of the locomotive platform.

The method may further include causing an external communications module to transmit a signal indicative of the user-entered horse power rating externally from the locomotive platform.

The method may further include in response to transmitting the signal indicative of the user-entered horse power rating, receiving a response indicative of whether the user-entered horse power rating is within the defined threshold of the expected horse power rating of the locomotive platform and which includes a key required to operate the system to supply electrical power to the traction motors.

The method may further include limiting a supply of power to the traction motors if the user-entered horse power rating is not within the defined threshold of the expected horse power rating of the locomotive platform. Producing a notification if the user-entered horse power rating is not within the defined threshold of the expected horse power rating of the locomotive platform may include providing a message via at least one of a visual indicator (e.g., display or indicator light) or aural indicator (e.g., speaker) and wirelessly transmitting a message externally from the locomotive platform.

An on-board telematics system for a locomotive may be summarized as including a number of intra-system communications modules that provide communications; at least one processor-readable storage medium; and at least one processor communicatively coupled to the intra-system communications modules and the at least one processor-readable storage medium, the at least one processor configured to log information to at least one processor-readable storage medium indicative of a respective amount of time that the locomotive operates at each of a operational states. The may also include a plurality of sensors positioned to sense respective ones of a plurality of operational conditions of at least one system of the locomotive communicative coupled to one or more of the intra-system communications modules.

The at least one processor may further log information to the at least one processor-readable storage medium indicative of a respective geographical position and/or elevation at which the engine of the power system of the locomotive operated for at least some of the rotational speeds and at least some of the amounts of time.

The at least one processor may further log information to the at least one processor-readable storage medium indicative of any occurrence of an override of an idle limiting function of the power system of the locomotive.

The at least one processor may further log information to the at least one processor-readable storage medium indicative of each location at which the locomotive stopped, along with at least one of a time that the locomotive stopped at the respective location, a time that the locomotive left the respective location, or a duration of time the locomotive was stopped at the respective location, logically associated in the non-transitory processor-readable storage medium with the respective location. The at least one processor may receive a signal from a global positioning receiver or a cellular communications receiver to determine the locations at which the locomotive stopped. The at least one processor may detect and log any unauthorized changes to a control subsystem of the locomotive. The at least one processor may detect a presence of the locomotive in an unexpected location and in response may report the unexpected location of the locomotive externally from the locomotive.

The on-board telematics system may further include at least one extra-system communications module operable to provide communications externally from the telematics system and the locomotive, including at least some of the information logged to at least one non-transitory processor-readable storage medium.

A method of operating an on-board telematics system for a locomotive, the telematics system comprising a number of intra-system communications modules that provide communications, at least one processor-readable storage medium; and at least one processor communicatively coupled to the intra-system communications modules and the at least one processor-readable storage medium may be summarized as including logging information by the at least one processor to the at least one processor-readable storage medium indicative of a respective amount of time the locomotive operates at each of a number of throttle positions.

The method may further include logging information by the at least one processor to the at least one processor-readable storage medium indicative of a respective geographic location at which the locomotive operated for at least some of the operational states and at least some of the amounts of time.

The method may further include logging information by the at least one processor to the at least one processor-readable storage medium indicative of any occurrence of an override of an idle limiting function of the power system of the locomotive.

The method may further include logging information by the at least one processor to the at least one processor-readable storage medium indicative of each location at which the locomotive stopped, along with at least one of a time that the locomotive stopped at the respective location, a time that the locomotive left the respective location, or a duration of time the locomotive was stopped at the respective location, logically associated with the respective location in the non-transitory processor-readable storage medium.

The method may further include receiving by the at least one processor a signal from at least one of a global positioning receiver or a cellular communications receiver; and using the received signal to determine the locations at which the locomotive stopped.

The method may further include detecting by the at least one processor any unauthorized changes to a control subsystem of the locomotive; and logging by the at least one processor any detected unauthorized changes to a control subsystem of the locomotive.

The method may further include detecting by the at least one processor a presence of the locomotive in an unauthorized location; and in response to the detection, causing a notification of the unexpected location of the locomotive to be reported externally from the locomotive.

The method may further include transmitting at least some of the information logged to the at least one non-transitory processor-readable storage medium externally from the telematics system and the locomotive.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with locomotives, engines, electric machines, control subsystems, and communications systems and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The headings and Abstract of the Disclosure provided herein are for convenience only and do not interpret the scope or meaning of the embodiments.

Figure 1:
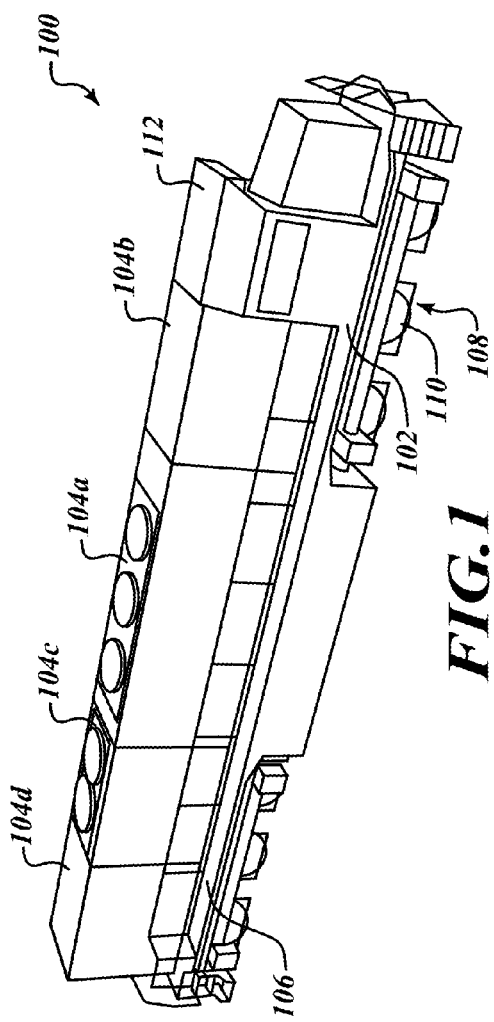
FIG. 1 is an isometric view of a locomotive including a locomotive platform and a number of modules or containers detachably coupled thereto to provide power, control and/or telematics, according to one non-limiting illustrated embodiment.

FIG. 1 shows a locomotive 100 according to one illustrated embodiment.

The locomotive 100 may include a locomotive platform 102 and one or more modules and containers 104a-104d (four illustrated, collectively referenced as 104). In the illustrated embodiment, the modules and containers 104 are selectively secured to the locomotive platform 102 as one or more integral units. Such may advantageously allow retro-fitting of locomotive platforms 102 which may be owned by a rail operator or leasing entity, or may allow an original equipment manufacturer (OEM) to easily outsource production of various components (e.g., electrical or power systems). The modules and containers 104 may be removable or detachably secured to the locomotive platform 102 using various fixtures or fasteners.

The locomotive platform 102 may include a base, chassis or carriage 106 (referred to herein as carriage), a number of axle/traction motor units 110 (only one called out in FIG. 1) with wheels 112 (only one called out in FIG. 1), and a cab 114. The locomotive platform 102 may be of conventional design. Some of the axle/traction motor units 110 may not be driven while other of the axle/traction motor units 110 are driven or powered. The discussion herein addresses the driven axle/traction motor units 110. The cab 112 may be suitable to accommodate a user or operator (e.g., train engineer). The cab 112 includes a number of controls, including a throttle, brake, and driven axle cutout switch (none illustrated in FIG. 1). While it is common to have a human operator present in the cab 112, the teachings herein are not limited to such, and may be employed with a remotely operated locomotive 100.

Figure 2:
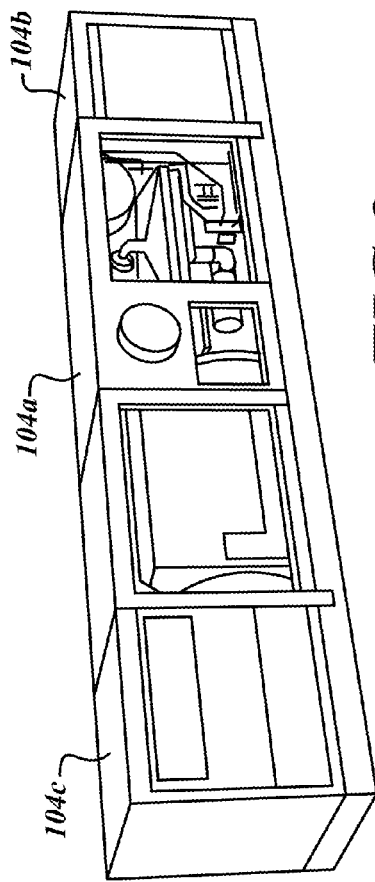
FIG. 2 is an isometric view of the modules or containers of FIG. 1.

FIG. 2 shows the modules and containers 104 of FIG. 1 in more detail.

The modules and containers 104 may take the form of one or more containers. Each module and container 104 may house certain components. For example, a power pack module and container 104a may house one or more engines (best illustrated in FIG. 3) and one or more electric machines (best illustrated in FIG. 3). An electrical module or container 104b may house one or more sets of traction motor power switching components, used to switch electrical power. A microprocessor or communications module or container 104c may house telematics-related components for logging various performance and other attributes, as well as components to provide communications within the locomotive 100 as well as between the locomotive 100 and other systems or networks. Each of these components is described in more detail herein.

Figure 3:
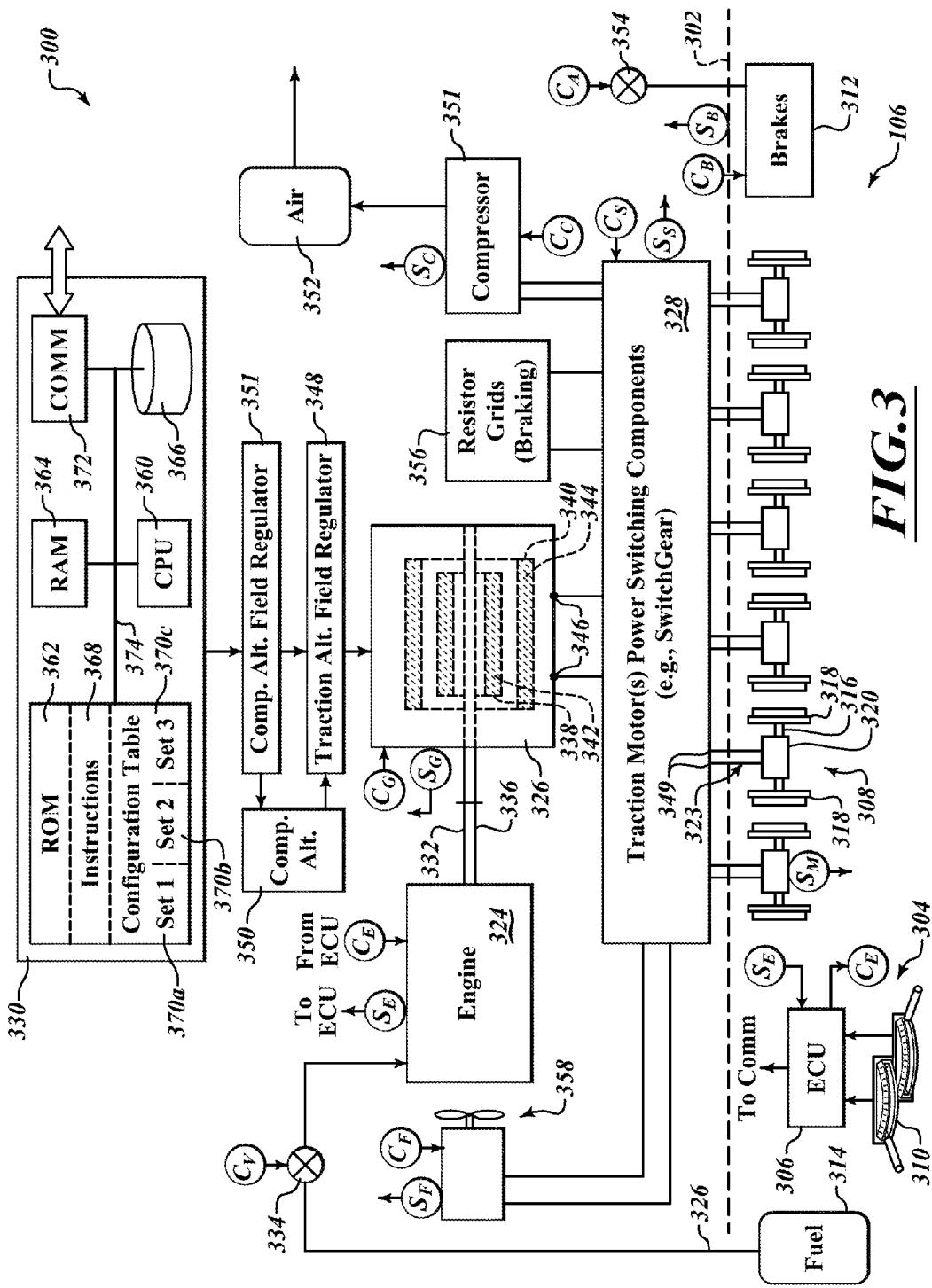
FIG. 3 is block diagram showing portions of the locomotive platform, the control system and the power system of FIGS. 1 and 2, according to one non-limiting illustrated embodiment.

FIG. 3 shows a power system 300 coupled with various components of the locomotive platform 106 (FIG. 1), according to one illustrated embodiment.

The components of locomotive platform 106 are generally illustrated below broken line 302 in FIG. 3, while the components of the power system 300 are generally illustrated above broken line 302. It is appreciated that in some embodiments, one or more components identified in FIG. 3 as part of the locomotive platform 106 may instead be part of the power system 300, and likewise one or more components identified in FIG. 3 as part of the power system 300 may instead be part of the locomotive platform 106. Such will depend on the particular installation.

The illustrated components of the locomotive platform include a throttle 304, an engine control unit (ECU) 306, axle/traction motor units 308 (only one called out in FIG. 3), a dynamic braking control 310, brakes 312 (only one illustrated and called out in FIG. 3), and a fuel tank or supply 314 (only one illustrated and called out in FIG. 3). The locomotive platform 106 may of course include additional components, as are found in conventional locomotives. In fact, one advantage of the techniques described herein is that such can be implemented with existing, conventional locomotives, allowing relatively simple and inexpensive retrofits, while potentially providing significant fuel savings and less pollution.

The throttle 304 may take a variety of forms. Typically, the throttle 304 will take a conventional form having a finite number of discrete or distinct positions or settings (commonly referred to as "notches" in the United States). For example locomotives in the United States commonly have eight (8) forward throttle positions or settings, in addition to idle and reverse settings. Each of the forward throttle positions or settings has an associated range of power (commonly represented as horse power) provided at that respective throttle setting. An example is set out in table 1, below.

TABLE 1

| Position | Engine RPM | Horsepower |
|---|---|---|
| STOP | 0 | 0 |
| IDLE | 900 | 0 |
| 1 | 900 | 75 |
| 2 | 900 | 200 |
| 3 | 1200 | 425 |
| 4 | 1200 | 675 |
| 5 | 1500 | 950 |
| 6 | 1500 | 1250 |
| 7 | 1800 | 1625 |
| 8 | 1800 | 2000 |
| DYNAMIC BRAKE/17T | 1200 | |

Likewise, the dynamic braking control 310 may have a finite number of discrete or distinct positions or settings (e.g., OFF, 1-8).

The throttle 304 and the dynamic braking control 310 are communicatively coupled to the control system of the locomotive platform 106. The control system may include a controller such as a processor, programmed logic controller (PLC), programmable gate array (PGA) or application specific integrated circuit (ASIC). Notably, the control system may communicate to an existing ECU (e.g., Cummins Quantum® ECU) on the engine of the power system.

The axle/traction motor units 308 may include one or more driven axle/traction motor units. Locomotives commonly employ 6 or 4 driven axle/traction motor units 308, although other numbers of driven axle/traction motor units 308 are possible. The driven axle/traction motor units 308 include an axle 316 (only one called out in FIG. 3), a pair of wheels 318 (only one pair called out in FIG. 3) mounted to the axle 316 for rotation therewith, and a traction motor 320 (only one called out in FIG. 3) coupled to drive the axle 316. The axle/traction motor units 308 may include additional components such as suspensions, brackets, mounts, and components which are conventional and not particularly relevant to this description. The traction motors 320 are typically directly coupled to the axle 316, and may take any of a variety of forms, for instance DC electric motors, AC electric motors, permanent magnet electric motors, etc. The traction motors 320 receive electrical power via power lines 322 (only one pair called out in FIG. 3). Electric power may be supplied in a variety of fashions, for example as DC electric power, or as AC single phase, two phase, or three phase electric power.

Brakes 312 typically take the form of pneumatic brakes, supplied with compressed air when actuated. There may, for example, be a respective set of brakes 312 associated with each of the axle/traction motor units 308 or just the driven axle/traction motor units 308.

One or more fuel tanks or supplies 314 may supply fuel to an engine 324 of the power system 300 via one or more fuel lines or conduits 326. Fuel may take a variety of forms, but typically will be diesel fuel.

The power system 300 includes at least one prime mover or engine 324 (only one illustrated in FIG. 3), at least one electrical machine 326 (only one illustrated in FIG. 3) to convert movement of part of the engine 324 to electrical power, at least one set of traction motor power switching components (TMPSC) 328 (only one illustrated in FIG. 3) to provide electrical power at least to the traction motors 320 of the driven axle/traction motor units 308, and a control subsystem 330 communicatively coupled to control operation of at least the engine 324, electric machine 326 and traction motor power switching components 328.

As noted above, the prime mover or engine 324 may take a variety of forms, but will typically take the form of an internal combustion engine, for instance a diesel engine. The diesel engine 324 has pistons that operate on a diesel cycle, rotating a crank shaft 332. As is commonly understood, fuel/air mixture may be adjusted to control the rotational speed, typically represented in terms of revolutions per minute (RPM). The prime mover or engine 324 may operate under control of the control subsystem 330, which may, for example, send a command to the ECU 306, control a valve, manifold or carburetor 334 to regulate the fuel/air mixture.

The electric machine 326 may take a variety of forms suitable for transforming movement produced by the engine 324 into electrical power. As noted above, the electric machine 326 will typically take the form of an alternator with internal rectification. The electric machine 326 has a drive shaft 336 which is coupled to the crank shaft 332 of the engine 324 to rotate therewith. Typically, rotation will rotate a rotor 338 relative to a stator 340, either or both of which will include coils or windings 342, 344 and/or permanent magnets (not illustrated). As is commonly understood, the rotation generates an electrical current, which flows to output terminals 346 of the electric machine 326. The output terminals 346 may take any of a variety of forms. The electric machine 326 may operate under control of the control subsystem 330, which may, for example, control a traction alternator field regulator 348 to excite one or more coils or windings 342, 344 of the electric machine 326.

The power system 300 may include a companion alternator 350 operable to produce electrical power, for example 3-phase electrical power which may, for example, be used to feed the main or traction alternator or electric machine 326. The power system 300 may further include a companion alternator field regulator 351 to excite one or more coils or windings (not shown) of the companion alternator 350, for instance in response to control signals from the control subsystem 330.

The set of traction motor power switching components 328 includes a variety of electrical, electronic and even mechanical or electromechanical components (not illustrated in FIG. 3) which are operable to provide electrical power to the traction motors, as well as other components, under control of the control subsystem 330, as desired or as is suitable. As discussed in more detail with reference to FIGS. 5A-5C, the set of traction motor power switching components 328 may, for example, include power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. (not illustrated in FIG. 3). The electrical power is supplied from the traction motor power switching components 328 via contacts 349 (only one pair called out in FIG. 3) thereof. The contacts 349 can take any of a variety of forms, for instance terminals, leads, posts, etc. The contacts 349 allow electrical coupling to components of the locomotive platform 106, for instance traction motors 320, as well as components of the power system 300, for instance the control subsystem 330.

The power system 300 may also include one or more compressors 351 to compress air or other fluid in a reservoir 352. The compressor(s) may be used to supply compressed air to the pneumatic brakes 312, for example via a valve 354. Compressed air or other fluid may also be passed to other locomotives (not shown) in a consist or to other cars (not shown) of a train via one or more conduits or lines, for instance to operate pneumatic brakes of those other locomotives or cars.

The power system 300 may also include one or more resistor grids 356 to dissipate heat produced during dynamic braking. For instance, the traction motors 320 may be controlled to operate as generators to slow the locomotive 100. In the case of locomotive 100, such operation typically generates more electrical power than can be stored in a power storage device (e.g., secondary battery array, super- or ultra-capacitor array, not shown). Thus, the excess power is dissipated via one or more resistor grids 356. Such operation is discussed in more detail in reference to FIGS. 5A-5C.

The power system 300 may also include one or more fans or blowers 358 (only one illustrated) to dissipate heat from one or more components. For example, one or more fans or blowers 358 may be positioned and operable to dissipate heat from the engine(s) 324. Also for example, one or more fans or blowers 358 may be positioned and operable to dissipate heat from the electric machine(s) 326. Also for example, one or more fans or blowers 358 may be positioned and operable to dissipate heat from the set(s) of traction motor power switching components 328. Also for example, one or more fans or blowers 358 may be positioned and operable to dissipate heat from the resistor grid(s) 356.

The control subsystem 330 includes a controller 360, for example a microprocessor, microcontroller, programmable logic controller (PLC), programmable gate array (PGA), application specific integrated circuit (ASIC) or another controller capable of receiving signals from various sensors, performing logical operations, and sending signals to various components. The controller 360 may take any of a variety of forms, for example a PLC (e.g., commercially available PLCs from Siemens). The control subsystem 330 may also include one or more non-transitory processor- or computer-readable storage media, for example read only memory (ROM) 362, random access memory (RAM) 364, and data store 366 (e.g., solid-state storage media such as flash memory or EEPROM, spinning storage media such as hard disk). The non-transitory processor- or computer-readable storage media 362, 364, 366 may be in addition to any non-transitory storage medium (e.g., registers) which is part of the controller 360.

As illustrated the ROM 362, or some other one of the non-transitory processor- or computer-readable storage media 362, 364, 366, stores instructions 368 and a number of sets of data or values for variables or parameters 370a, 370b, 370c (only three illustrated, collectively 370). The sets of data or values for variables or parameters 370 specify values of variables or parameters to operate for specific locomotive platforms 106. For example, a first set 370a may specify specific values for a first type of locomotive platform 106 produced by a first OEM having 6 driven axles. A second set 370b may specify specific values for a second type of locomotive platform 106 produced by the first OEM having four driven axles. A third set 370c may specify specific values for a third type of locomotive platform produced by a second OEM, different than the first OEM, having six driven axles. A greater or lesser number of sets of values may be stored, for example to accommodate a large variety of locomotive platforms 106. The sets 370 may take a variety of forms, for example a lookup table, a set of records in a database, etc. A set of values for the configuration table could be downloaded remotely from a central administrative site or entered locally via a directly connected PC.

The controller 360 may use RAM 364 in a conventional fashion, for volatile storage of instructions, data, etc. The controller 360 may use data store 366 to log or retain information, for example telemetric information related to performance of the engine 324, electric machine 326, or locomotive 100 (FIG. 1) itself.

The instructions 368 are executable by the controller 360 to control operation of the power system 300 and/or locomotive platform 106, in response to user or operator input, and using a selected one of sets of data or values for the variables or parameters 370. Advantageously, a single set of instructions 368 may be employed to control a wide variety of different locomotives, for example from different OEMs, having different numbers of driven axles, and/or different horse power ratings, simply by accessing the sets 370.

The control subsystem 330 may additionally include one or more communications modules or subsystems 372 which facilities communications with the various components of the power system 300 and the locomotive platform 106, as well as components that are not part of the locomotive 100 (FIG. 1). The communications modules or subsystems 372 may include various wired and wireless transmitters, receivers, transceivers, ports, etc., suitable for networked and non-networked communications. The control subsystem 330 may include one or more buses 374 (only one illustrated) coupling various components together, for example one or more power buses, instruction buses, data buses, etc.

The control subsystem 330 receives signals, indicative of operation of various user controls, for instance throttle settings or dynamic braking settings. The control subsystem 330 may be coupled to the ECU 306 off existing communications lines or buses to communicate with and control the engine 324. This allows easy retro-fit of existing locomotive platforms 106.

The control subsystem 330 also receives signals from various sensors and/or other components of the power system 300 which include information that characterizes or is indicative of operation, status, or condition of such other components. Sensors are represented in FIG. 3 by the letter S appearing in a circle along with an appropriate subscript letter.

For example, one or more engine sensors $S_E$ may detect operation characteristics or conditions associated with the engine 324, for instance RPM, temperature, oil pressure, mixture, etc. Also for example, one or more generator sensors $S_G$ may detect operation characteristics or conditions associated with the electric machine 326, for instance RPM, temperature, excitation values of the coils, current or voltage, etc. Also for example, one or more traction motor power switching components sensors $S_S$ may detect operation characteristics or conditions associated with the switch gear 328, for instance current, state or switch condition, voltage, etc. Also for example, one or more compressor sensors $S_C$ may detect operation characteristics or conditions associated with the compressor 351, for instance pressure, flow rate, flow volume, etc. Also for example, one or more fan sensors $S_F$ may detect operation characteristics or conditions associated with the fan or blower(s) 358, for instance RPM, flow rate, flow volume, etc.

The control subsystem 330 also receives signals from various sensors and/or other components of the locomotive platform which include information that characterizes or is indicative of operation, status, or condition of such other components. For example, one or more motor sensors $S_M$ may detect operation characteristics or conditions associated with the traction motor(s) 320, for instance RPM, temperature, wear, etc. Also for example, one or more brake sensors $S_B$ may detect operation characteristics or conditions associated with the brakes 312, for instance temperature, pneumatic pressure, etc.

The control subsystem 330 provides signals to various actuators and/or other components responsive to control signals of the power system 300, and optionally of the locomotive platform 106 which signals include information that characterizes or is indicative of an operation the component is to perform or a state or condition in which the components should enter. Control signals, actuators or other components responsive to control signals are represented in FIG. 3 by the letter C appearing in a circle along with an appropriate subscript letter.

For example, one or more engine control signals $C_E$ may affect the operation of the engine 324, for instance adjusting a flow of air or oil. Also for example, one or more generator control signals $C_G$ may affect the operation or state of the electric machine 326, for example exciting one or more coils or windings. In practice, such may be effectively implemented via the field current regulator 348 and field current alternator 350. Also for example, one or more fuel valve control signals or actuators $C_V$ may affect the operation or state of the fuel valve, manifold or carburetor 334, for instance adjusting a fuel/air mixture to the engine 324.

Also for example, one or more traction motor power switching components control signals $C_S$ may affect the operation or state of the traction motor power switching components 328, for instance coupling power to selected ones of the traction motors 320, coupling selected traction motors 320 electrically in series and/or in parallel with other selected ones of the traction motors 320. Such may advantageously be employed to cause the traction motors 320 to produce high torque at low speeds, while allowing more efficient operation at higher speeds. Also for instance, traction motor power switching components control signals $C_S$ cause the traction motor power switching components 328 to enter a dynamic braking mode, and electrically couple the traction motors 320 to resistor grid(s) 356 to dissipate excess electrical energy as heat. Also for example, one or more fan control signals or actuators $C_F$ may cause the fan or blower(s) 358 to operation, for instance at a desired RPM, flow rate, flow volume, etc.

While only one fan is illustrated, a container may have separate fans for the engine 324 and for the dynamic brake grids 356, respectively. Also for example, one or more compressor control signals or actuators $C_C$ may cause the compressor 351 to operate, for instance at a desired RPM, flow rate, flow volume, etc. Also for example, one or more pneumatic control signals or actuators $C_A$ may operate the valve 354 to control a supply of pressurized air to the brakes 312.

The control subsystem 330 also sends control signals to various actuators and/or other components of the locomotive platform 106 which include information that controls operation, state or condition of, such components. For example, one or more brake control signals or actuators $C_B$ may control operation of brakes 312 associated with one or more of the axle/traction motor units 308. More typically, such may be implemented via the valve (e.g., valve 354) or regulator.

Figure 4:
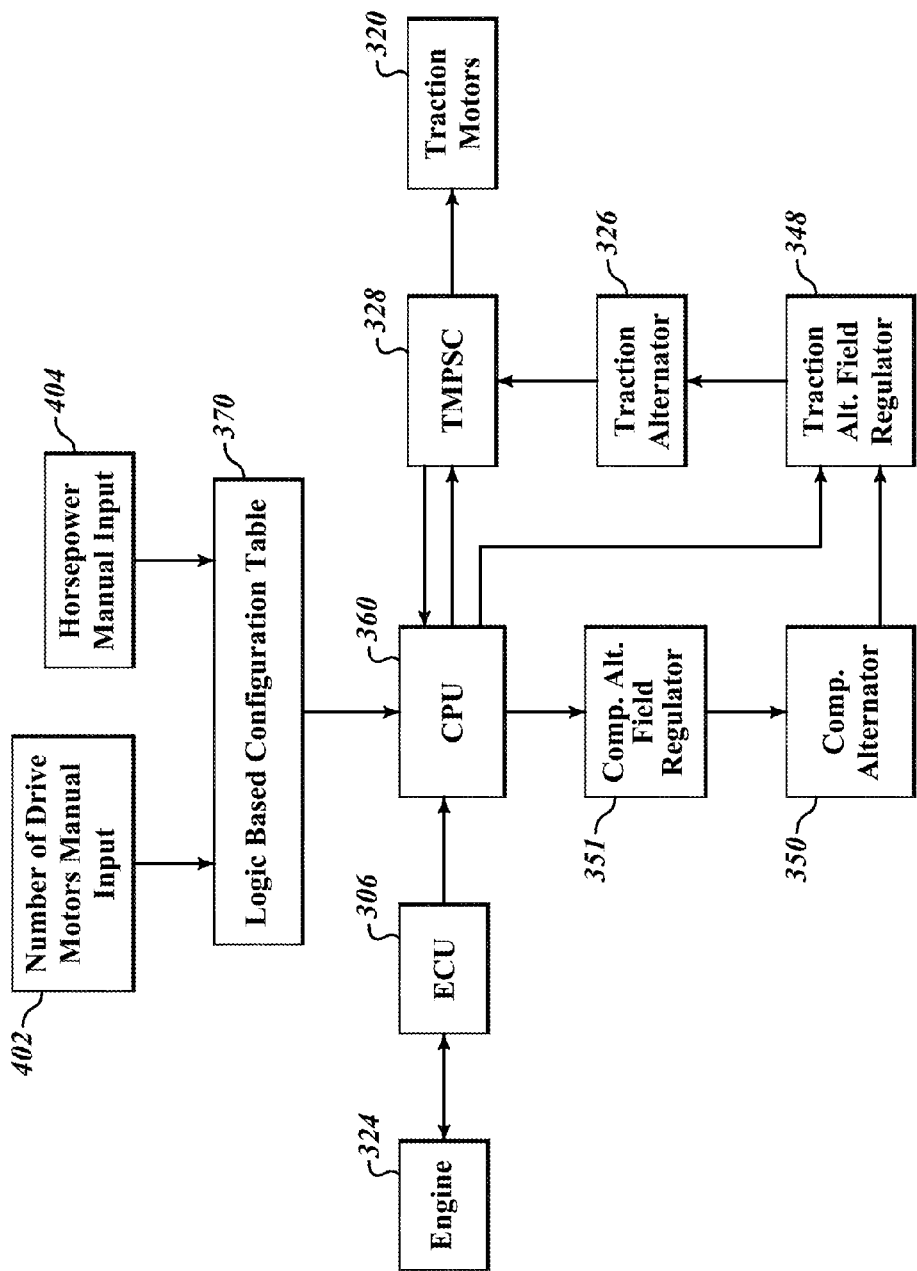
FIG. 4 is functional block diagram showing interaction of various system components of the power system of FIGS. 1-3, according to one non-limiting illustrated embodiment.

FIG. 4 shows interaction of the controller with various other components, according to one illustrated embodiment. Components that are identical or similar to those discussed with reference to FIG. 3 are referenced using the same reference numbers used in FIG. 3. In the interest of conciseness, only significant differences are discussed below.

As illustrated, the controller 360 uses input 402 indicative of the number of driven axle/traction motor units 308 or traction motors 320 and input 404 indicative of the horse power of the locomotive platform 106, and a logic based configuration table 370 to control operation of the power system 300 and, optionally, components of the locomotive platform 106. While illustrated in FIG. 4 as manual inputs, in some instances these inputs may be automatically derived by the controller 360.

The controller 360 receives input from the ECU 306, for example signals indicative of a throttle setting, dynamic brake setting, or cutout of one or more driven axle/traction motor units 308.

Based on the input 402, 404 and the specific configuration 370 specified for the locomotive platform 106, the controller 360 controls a field current regulator 348 and field current alternator 350 to selectively excite windings or coils 342, 344 of the electric machine 326 (identified as alternator in FIG. 4). The controller 360 also controls RPM of the engine 324. In particular, the controller 360 may operate to minimize RPM while still ensuring that sufficient power is available at any given throttle setting. The controller 360 may determine whether an increase in RPM of the engine 324 can be avoided in response to an increase in throttle setting, for example by exciting or increasing excitation of the windings or coils 342, 344 of the electric machine 326. The controller 360 may employ the lowest RPM at any given throttle setting that, in combination with the electric machine 326, provides the rated power associated or specified for the throttle setting for the particular locomotive platform 106. Such may advantageously increase fuel economy and lower pollution.

The electric machine 326 supplies current to the traction motor power switching components 328. The traction motor power switching components 328 provides information to the controller 360, for example sensed current at various locations in the circuitry of the traction motor power switching components 328. The controller 360 controls the traction motor power switching components 328 to selectively couple electrical power to the traction motors 320, arranged in various combinations of series and parallel arrangements. The controller 360 may advantageously electrically couple the traction motors 320 in series and/or parallel combinations, for example employing series coupling to provide high current to achieve high torque at low speeds and employing parallel coupling to provide high voltage to achieve more efficient operation at high speeds, thereby increasing fuel economy and lowering pollution.

Figure 5A:
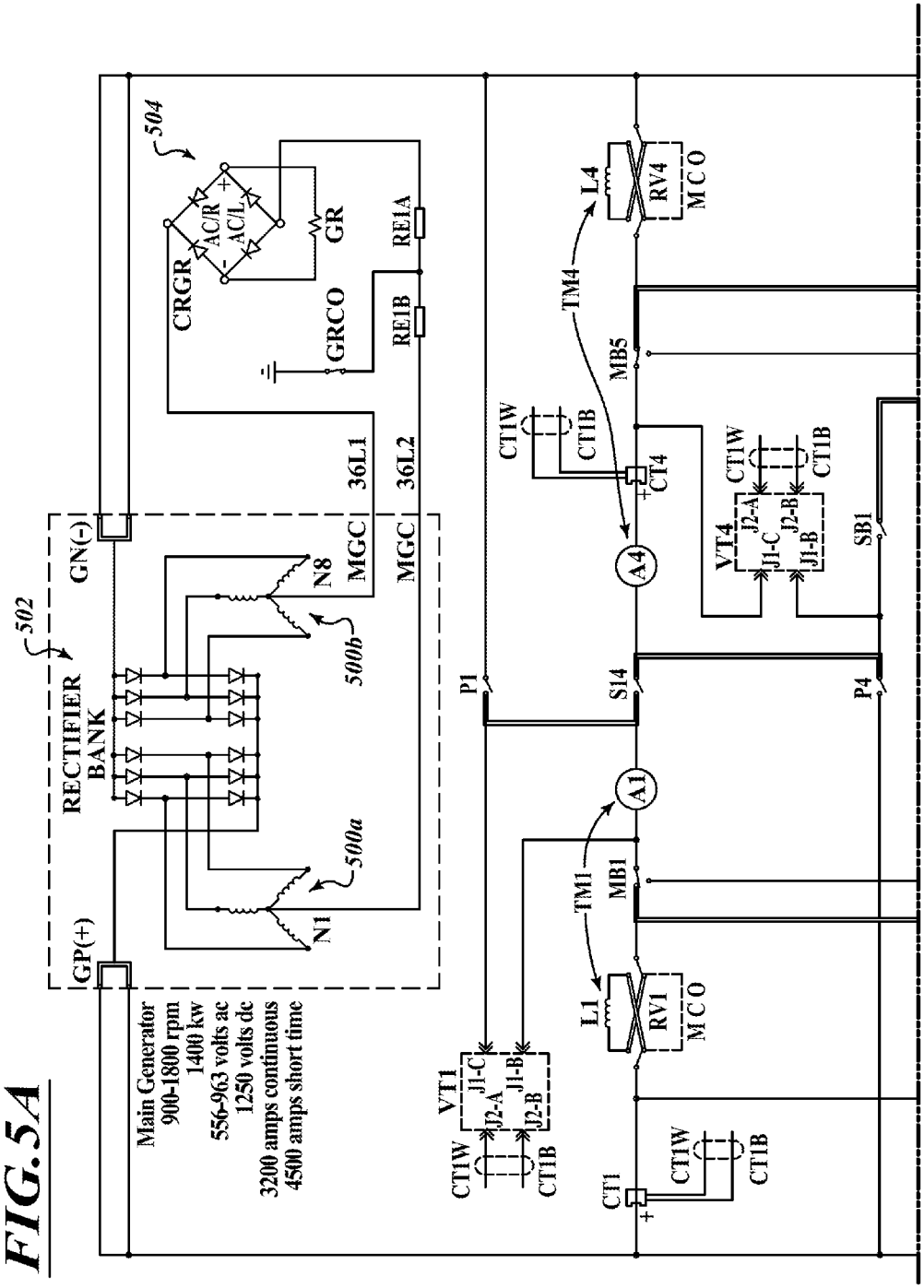
FIGS. 5A-5C are an electrical schematic diagram showing the power system of FIGS. 1-3 coupled to power the traction motors of the locomotive platform, according to one non-limiting illustrated embodiment.
Figure 5B:
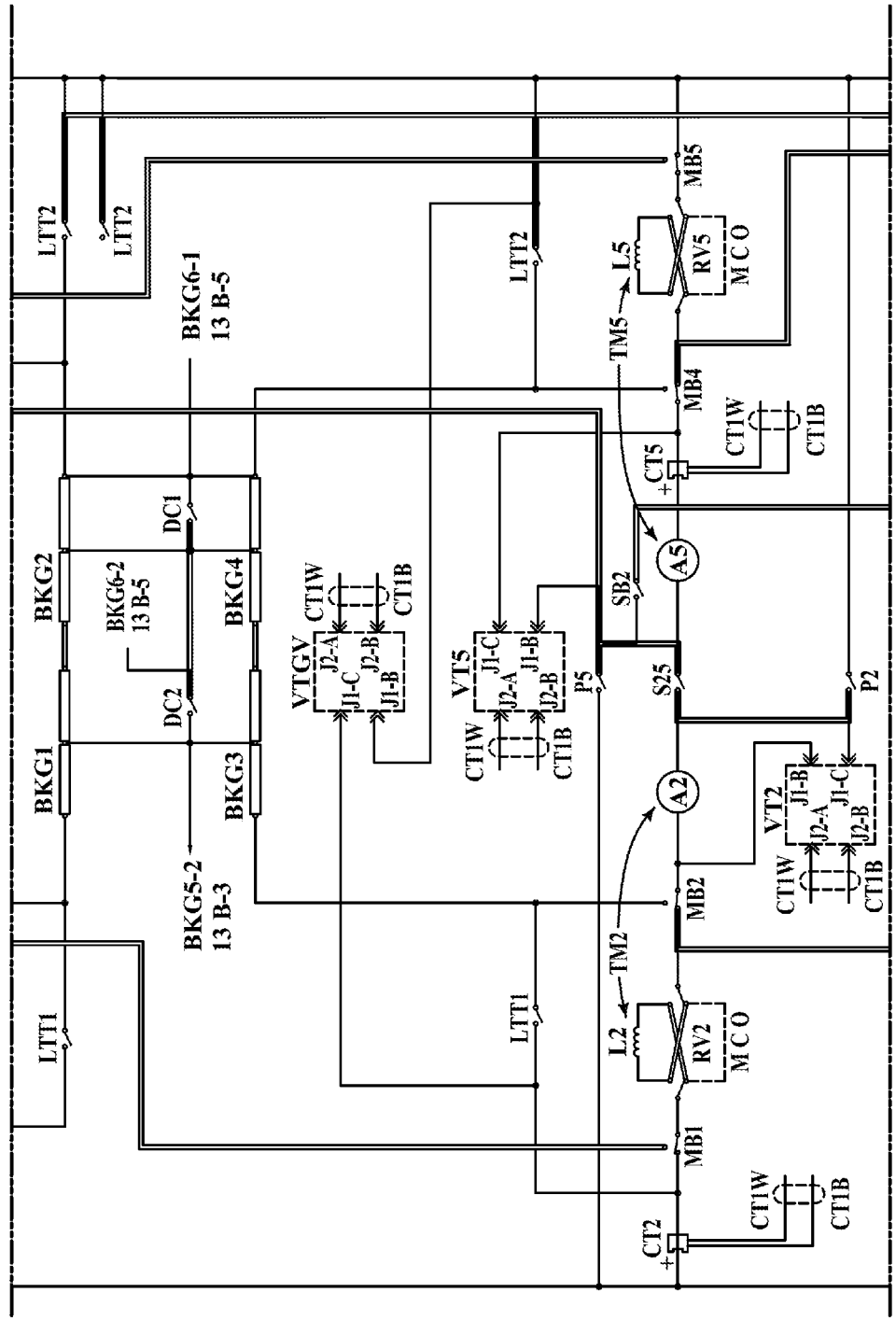
Figure 5C:
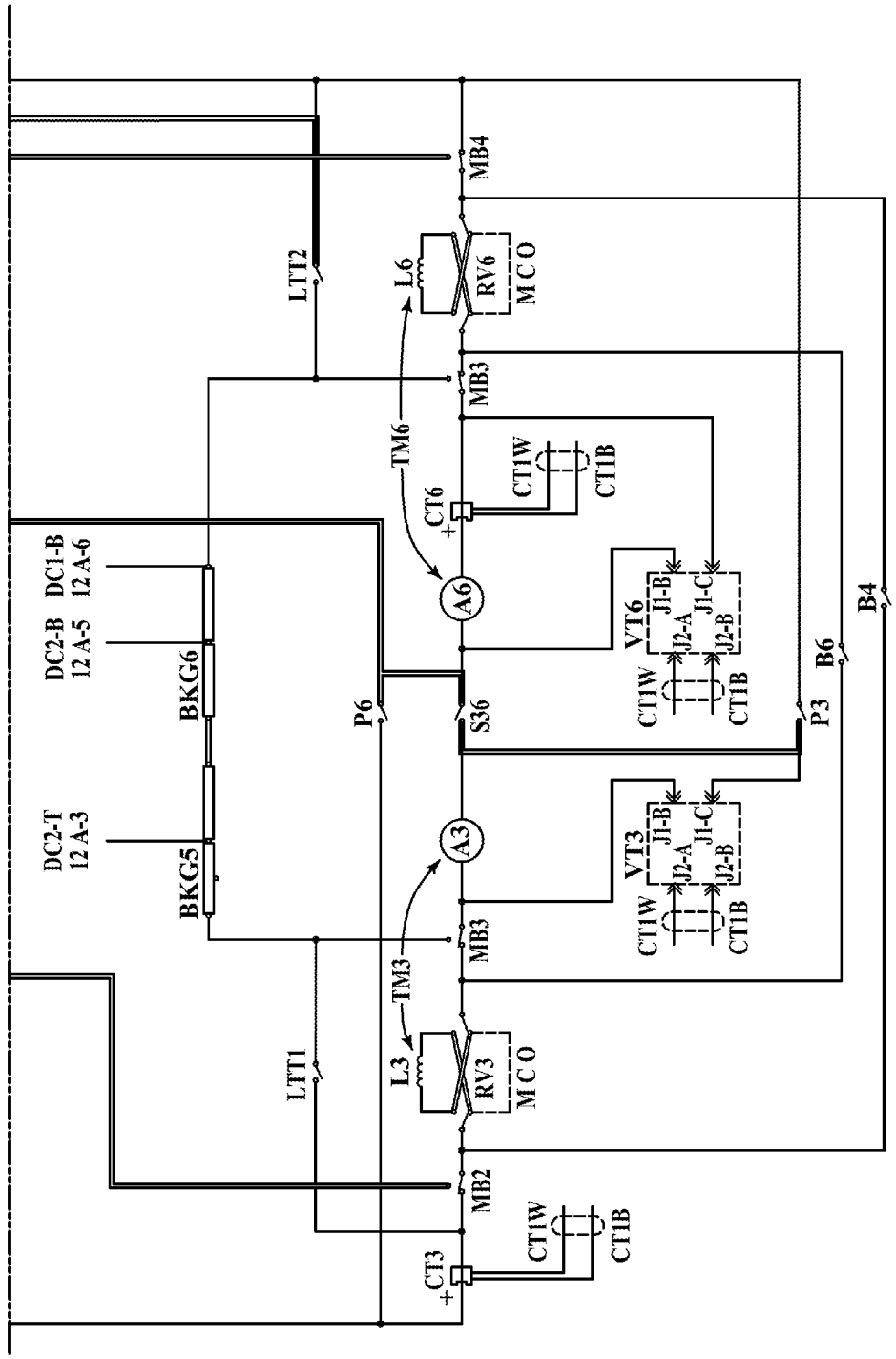

FIGS. 5A-5C schematically show portions of the electric machine 326 (FIG. 3), traction motors 320 (FIG. 3), traction motor power switching components 328 (FIG. 3), and resistor grids 356 (FIG. 3) for an embodiment installed on a locomotive platform 106 (FIGS. 1 and 3) having six driven axles units 308. Other embodiments suitable for locomotive platforms 106 with a lesser or greater number of driven axles units 308 may employ a similar circuit structure, simply treating the portions of some of the traction motors 320 in FIGS. 5A-5C as open circuits or adding additional components in like fashion for each additional driven axle/traction motor unit 308.

In particular, FIGS. 5A-5C illustrate windings or coils 500a, 500b (collectively 500) of the electric machine 326 (FIG. 3), for example in 3 phase Wye configuration. A ground fault circuit 502 may be electrically coupled across the windings or coils 500 to handle possible ground faults of the electric machine 326.

A diode rectifier bridge 504 rectifies current generated in the windings or coils 500. The diode rectifier bridge 504 may be part of the electric machine 326, or can be separate therefrom.

As noted above, the illustrated embodiment includes six traction motors TM1-TM6, which include respective field coils L1-L6 and armatures A1-A6. In the illustrated embodiment, the traction motors TM1-TM6 are part of the locomotive platform 106 (FIGS. 1 and 3). In the illustrated embodiment, the traction motor power switching components 328 (FIG. 3) is housed in a module or container 104 (FIGS. 1 and 2), which may be retrofitted or selectively coupled to the locomotive platform 106. Thus, the traction motors TM1-TM6 are electrically coupled to the traction motor power switching components 428 (FIG. 3) by suitable high voltage connectors.

A set of bus bars and contactors or other switches allow the selective coupling of traction motors TM1-TM6 to the rectified output of the electric machine.

The control subsystem 330 (FIG. 3) provides control signals to control the contactors (i.e., RV1, RV2, RV3, RV4, RV5, RV6, MB1, MB2, MB3, MB4, MB5, MB6, LTT1, LTT2, P1, P2, P3, P4, P5, P6, S14, SB1, SB2, S25, S36, DC1, DC2, B4, B6) to selectively couple the traction motors TM1-TM6 to the rectified current. Each of the traction motors TM1-TM6 is associated with a respective reversing contactor RV1-RV6.

The control subsystem 330 may selectively dynamically cause the contactors RV1-RV6 to be opened or OFF and closed or ON to change polarity of the traction motor TM1-TM6 field circuits to achieve directional control (e.g., forward, reverse). The control subsystem 330 may selectively dynamically cause the contactors to be opened or OFF and closed or ON to convert the operation of the traction motor TM1-TM6 into generators for dynamic braking operation. For example, the contactors may be configured to connect the traction motor field windings to the traction alternator 326 (FIG. 3) and the traction motor armatures to the braking grids 356 (FIG. 3) BKG1-BKG6. Further, the control subsystem 330 may selectively dynamically cause the contactors to be opened or OFF and closed or ON to electrically couple the traction motors TM1-TM6 in various combinations or series and parallel with one another with respect to the windings or coils 500 of the electric machine 326 (FIG. 3), depending on the desired characteristics or performance, for example increasing current to achieve high torque or adjusting voltage to achieve high speeds. As described herein, in one example the control subsystem 330 electrically couples the traction motors TM1-TM6 in series at low speeds, progressively electrically coupling traction motors TM1-TM6 in parallel as speed increases. Such may increase energy efficiency over other forms of operation.

The illustrated embodiment also includes three sets of resistor grids BKG1, BKG2; BKG3, BKG4; BKG5, BKG6. The resistors grids BKG1, BKG2; BKG3, BKG4; BKG5, BKG6 are employed to dissipate electrical power as heat generated by the traction motors TM1-TM6 when operating in dynamic braking mode. The control subsystem 330 (FIG. 3) provides control signals to dynamically control the contactors (i.e., opened or OFF and closed or ON) to selectively couple the traction motors TM1-TM6 to the resistor grids BKG1, BKG2; BKG3, BKG4; BKG5, BKG6 to achieve the desired or indicated braking threshold. The control subsystem 330 may cause pairs of contactors (e.g., DC1, DC2) to alternate in ON/OFF states, to achieve maximum braking effort at very slow speeds.

Voltage transducers VT1-VT6, VTGV provide voltage measurements to the control subsystem 330. Current transducers CT1-CT6 provide current measurements to the control subsystem 330. Slip detectors VT1-VT6 in combination with current transducers CT1-CT6 detect slip of wheels driven by respective ones of the traction motors TM1-TM6.

Figure 6:
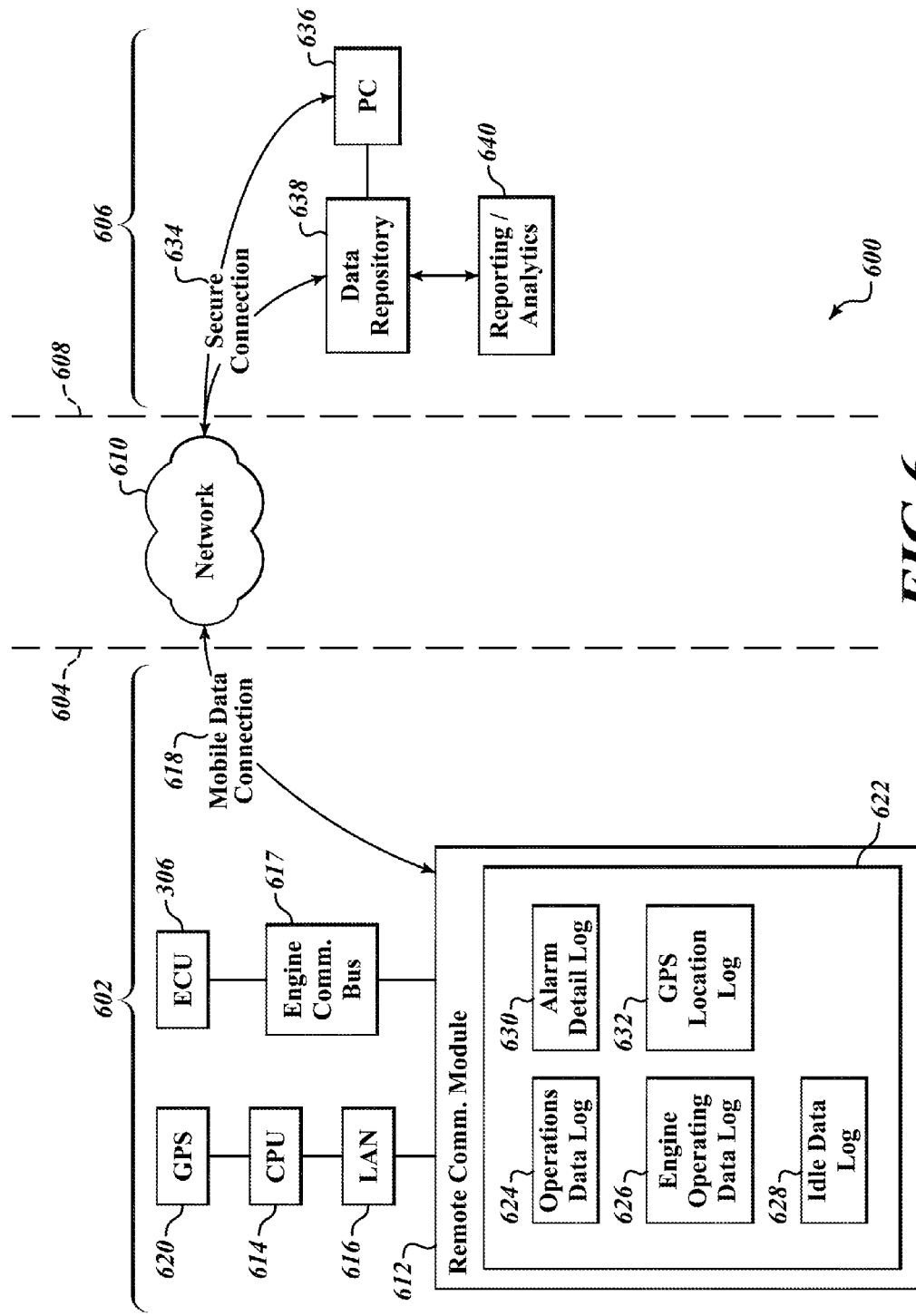
FIG. 6 is a schematic diagram showing a telematics system including components mounted on the locomotive communicatively coupled with back office components, according to one non-limiting illustrated embodiment.

FIG. 6 shows a telematic system 600, according to one illustrated embodiment. The telematic system 600 may be particularly suitable for use with a locomotive, so is described in the context of such. It is appreciated that the telematic system 600 may have uses in other non-locomotive related environments. The telematics system 600 acts as a single point portal to provide enhanced information to rail operators, owners, or other entities.

As background, locomotives typically operate, on average, 12 hours per day (50% duty cycle). When not operating, the locomotive is either: 1) completely powered off including the batteries; 2) powered on, but engine is not running; 3) in idle limiting mode, where the engine was automatically shutdown; 4) powered on with the engine running, but locomotive not moving; or 5) in a state following a failed anti-idle attempt.

An "on-board" portion 602 of the telematic system 600 resides on the locomotive, and is generally illustrated to the left of a broken line 604. Such portion 602 may be referred to herein as "on-board" since the portion 602 resides on-board the locomotive 100 (FIG. 1). An "off board" or "back office" portion 606 of the telematic system 600 resides off the locomotive 106, and is generally illustrated to the right of a broken line 608. Such portion 606 may be referred to herein as the "off board," "back office" or even "host" portion since the portion 606 does not reside on-board the locomotive 106, but rather may reside at one or more locations such as a fixed location (e.g., rail operations center) or a number of different fixed locations.

The on-board portion 602 and off-board portion 606 are communicatively coupled via one or more communications channels 610. The communications channel(s) 610 generally are not part of either the on-board or off-board portions 602, 606, so is illustrated as residing between broken lines 604, 608. The communications channel(s) 610 may take any of a large variety of forms, and may include combinations of different types of communications channels. For example, the communications channel(s) 610 may include a mobile communications network (e.g., cellular phone and/or data network), which relies on base stations to wirelessly communicate with the on-board cellular transceiver. One or more wired or optical fiber portions may provide a connection between the base station and one or more components of the off-board or back office portion. Even a satellite channel may be employed as the communications channel or portion thereof. The communications channel(s) 610 may include one or more networked portions, for example the Internet, satellite network, an extranet, an intranet. The physical aspects and protocols of the communications links should not be considered limiting in any respect.

The on-board portion 602 includes a remote communications module 612. The remote communications module 612 can take any of a large variety of forms suitable for providing communications between the various components on the locomotive 106 (FIG. 1) and the off-board portion 606. The remote communications module 612 may include one or more ports, connectors or couplers to provide wired or optical signal paths to the various components of the on-board portion 602. The remote communications module 612 may include one or more ports, wireless receivers, wireless transmitters or wireless transceivers to provide wireless signal paths to the various components of the off-board portion 606. The remote communications module 612 may include one or more bridges or routers suitable to handle network traffic including switched packet type communications protocols (TCP/IP), Ethernet or other networking protocols, including proprietary protocols employed by various proprietary engine control units (ECUs).

Typically, the remote communications module 612 includes a cellular communications unit that allows voice, data or other information to be transferred via a secure cellular connection 618 between the on-board and the off-board portions 602, 606, respectively. The cellular communications unit will typically include one or more transceivers and antenna(s) suitable for cellular communications using any conventional communications frequency ranges (e.g., 800 MHz, 1800 MHz, 1900 MHz) and protocols (e.g., CDMA, D-AMPS, TDMA, PCS, GSM). Many suitable cellular communications units are commercially available. In some instances, data or information may need to be buffered or otherwise retained or stored while cellular coverage is unavailable (e.g., passing through a tunnel, mountains or rural locations). Transfer of information may occur when cellular communications is re-established or when signal strength is sufficient.

The remote communications module 612 is communicatively coupled to a controller 614, for example via local area network (LAN) such as a local Ethernet or other parallel or serial data connection 616. The controller 614 may take the form of the controller 360 (FIG. 3) of the power system 300. Alternatively, the controller 614 may be dedicated to the telematics function, for example as a part of the telematic system 600 housed in the database or communications module or container 104c (FIGS. 1 and 2). The remote communications module 612 may provide remote access to the control subsystem 330 (FIG. 3) to retrieve data therefrom or to send instructions or data thereto. Thus access is provided to the electronics of the container or module 104a (FIGS. 1 and 2), including contactors, engine, generator or alternator, and traction motor power switching components.

The remote communications module 612 is communicatively coupled to the ECU 306 of the engine 324 (FIGS. 1 and 3), for example via an engine communications bus 617, for instance a controller-area network (CAN) bus and chipset (e.g., compliant with SAE J1939 standard). In some embodiments, the controller 614 and/or ECU 306 may constitute part of the on-board portion 602 of the telematic system 600, while in other embodiments the controller 614 and/or ECU 306 may simply communicatively interface with the on-board portion 602. The remote communications module 612 may provide access for the CPU 614 to the ECU 306 to retrieve data therefrom or to send instructions or data thereto. Thus remote access is provided to the electronics of cab 112 (FIG. 1), including the control stand. This also may provide remote access to the traction motors, dynamic braking, compressor and other systems or components.

The on-board portion 602 may optionally include a global positioning system (GPS) receiver 620 to which the CPU 614 is communicatively coupled either directly, or indirectly (e.g., via LAN 616). The GPS receiver 620 provides location or position coordinates including elevation at any given time. Many suitable GPS receivers are commercially available. The GPS receiver 620 may, for example, allow tracking of the locomotive 100 (FIG. 1) or train that the locomotive is pulling. Using stored geographic or topological information, the controller 614 may use the location or position coordinates to determine an altitude or elevation at the location or position. Note, the terms altitude and elevation are used interchangeable herein. Alternatively, elevational could be assessed with an on-board altimeter (not shown). The altimeter may be calibrated from time to time with a known elevation for a particular location, which may be wirelessly provided to the locomotive in response to receipt of coordinates of the location.

The communications module includes a data store 622. The data store 622 may take a large variety of forms, which may be selected based on how much data must be stored. Such may be based on the quantity of data being logged or stored per unit of time, as well as based on expected durations of storage, for instance expected durations during which cellular communications will be unavailable. Some examples of suitable devices for the data store 622 include NVRAM, ROM, RAM, and solid-state drives (SSDs). The data store 622 may be dedicated to the telematics function, for example as a part of the telematic system 600 housed in the d communications module or container 104c (FIGS. 1 and 2). Alternatively, the data store 622 may take the form of the data store 366 (FIG. 3) of the control system 330.

The data store 622 logs or stores various operating characteristics. For example, the data store 622 may log or store one or more of an operations data log 624, an engine operating data log 626, an idle data log 628, an alarm details log 630, and/or a GPS location log 632. These are illustrated as separate elements in FIG. 6 since the information will likely be segregated, although may reside on the same non-transitory computer- or processor-readable storage medium. However, it is appreciated that the information may not necessarily be segregated, and may at least be related or linked (e.g., pointers to fields of records). For instance, GPS location data for any given date and/or time may be linked to engine performance data at that date and/or time.

In particular, the operations data log 624 may store data or information related to operation of the locomotive 100 (FIG. 1), locomotive platform 106 (FIG. 1) (e.g., traction motors, brakes), controls (e.g., throttle, dynamic brakes) thereof, and/or power system 300 (FIG. 3). Such may reflect operation over time. For example, such information may be sampled periodically (e.g., every second, minute, hour) or may be sampled in response to changes of conditions or states (e.g., change in throttle setting). An example of operations data logging is illustrated in Table 2, below. Alternatively or additionally, such information may be logged as events or conditions. For example, each time a throttle position is changed, the time in a given throttle position may be logged, along with other information relevant to operation at that particular throttle position or time period.

TABLE 2

| No. | Name | Description |
|---|---|---|
| 1 | Date | YYMMDD |
| 2 | Time | HHMMSS |
| 3 | Container number | NNNNNNNN |
| 4 | Horsepower | Horsepower produced |
| 5 | Duration | Duration of this state |
| 6 | Mode | Operational Mode |

The engine operating data log 626 may store data or information related to operation of the engine 324 (FIG. 3), for instance engine RPM, oil pressure, oil level, fuel/air mixture, and/or wear indications. Such may reflect engine operation over time. For example, such information may be sampled periodically (e.g., every second, minute, hour) or may be sampled in response to changes of conditions or states (e.g., change in RPM). Engine operating data may be generated, captured or logged only when the locomotive is moving and doing work. The data or information may be collected directly from the ECU 306, or by the controller 614. The data or information may include or be associated with a date, time stamp and a unique module or container identifier. Data and information may be transmitted remotely from the locomotive at various times throughout the day, for example where cellular coverage is available. An example of operations data logging is illustrated in Table 3, below.

TABLE 3

| Number | Description | Format |
|---|---|---|
| 1 | Date | YYMMDD |
| 2 | Time | HHMMSS |
| 3 | Container number | NNNNNNNN |
| 4 | Engine speed | rpm |
| 5 | Load Percentage | % |
| 6 | Accelerator Throttle Percentage | % |
| 7 | Commanded TSC1 Reference Speed | rpm |
| 8 | Average Temperature | deg F. |
| 9 | Average Air Intake Temperature | deg F. |
| 10 | Average Oil Temperature | deg F. |
| 11 | Fuel Temperature | deg F. |
| 12 | Fuel Consumption | CF/hr |
| 13 | Average Oil pressure | PSIG |
| 14 | Ambient Air Pressure | INHG |
| 15 | Engine Torque | Nm |
| 16 | Exhaust temperature | deg C. |

The idle data log 628 may store data or information related to idling operation of the locomotive 100 (FIG. 1), locomotive platform 106 (FIG. 1), and/or power system 300 (FIG. 3). Idling reflects those times the locomotive is not performing any work, and may reflect various different idle modes. The data or information may reflect periods of idle operation over time. The data or information may include start time and duration for each occurrence of idling. The idling information may include date, time stamp and a unique module or container identifier. In addition to any instances of idling, such may log any instances of user or operator over-ride of idle limiting functions or attempts at overriding the idle limiting function. Idle limiting functions automatically prevent a locomotive from remaining in idle for extended periods, saving fuel and wear on the engine. However, users or operators are known to routinely override this function. Logging overrides may allow the owner or operating authority to assess the impact of overrides, revise training materials, or take corrective action against specific operators. Thus, it may be useful to log the identity of, or an identifier that identifies, the operator. As discussed above, information may be sampled periodically (e.g., every second, minute, hour) or may be sampled in response to changes of conditions or states (e.g., change in throttle setting, override of idle limiting function). Also as discussed above, information may be stored in response to events or conditions, and may be stored with unique mode or condition identifiers or numbers.

The alarm details log 630 may store data or information related to alarms which occur during operation of the locomotive 100 (FIG. 1), locomotive platform 106 (FIG. 1), controls (e.g., throttle, dynamic brakes) thereof, and/or power system 300 (FIG. 3). Such may reflect alarms that occur over time. For example, such information may be sampled periodically (e.g., every second, minute, hour) or may be sampled in response to changes of occurrence of alarms. The alarm details log 630 may be particularly useful for performing diagnostics. Such may, for example capture all control subsystem inputs, for example at 40 times a second. Such may capture a window or snapshot of time. For example, such may capture or log inputs for three seconds preceding and three seconds following an event that gave rise to the alarm. At 40 times a second, this would capture 240 values for each alarm event. The data or information may include a header, and information suitable for identifying the alarm event and possible source. Notification of occurrence of an alarm event may be immediate, and may include the transmitting of one or more electronic messages (e.g., SMS, email) from the locomotive. Such may also include providing a visual or audible alert within the cab of the locomotive. An example of alarms data logging is illustrated in Table 4, below.

TABLE 4

| No. | Name | Description | Bytes |
|---|---|---|---|
| 1 | DATE | YYMMDD | 2 |
| 2 | TIME | HHMMSS | 2 |
| 3 | CONTAINER NUMBER | NNNNNNNN | 2 |
| 4 | 3T | TRAINLINE 3 | 1 |
| 5 | 6T | TRAINLINE 6 | 1 |
| 6 | 21T | TRAINLINE 21 | 1 |
| 7 | 23T | TRAINLINE 23 | 1 |
| 8 | FPCR | FUEL PUMP CONTROL RELAY | 1 |
| 9 | PCR | PNEUMATIC CONTROL RELAY | 1 |
| 10 | 5T | TRAINLINE 5 | 1 |
| 11 | 10T | WHEEL SLIP TRAINLINE | 1 |
| 12 | 7T | TRAINLINE 7 | 1 |
| 13 | 8T | TRAINLINE 8 | 1 |
| 14 | 9T | TRAINLINE 9 | 1 |
| 15 | 12T | TRAINLINE 12 | 1 |
| 16 | THS IDLE | POWER THROTTLE IN IDLE | 1 |
| 17 | 15T | TRAINLINE 15 | 1 |

TABLE 4-continued

| No. | Name | Description | Bytes |
|---|---|---|---|
| 18 | 16T | TRAINLINE 16 | 1 |
| 19 | 17T | TRAINLINE 17 | 1 |
| 20 | DBCOS | DYNAMIC BRAKE CUTOUT SWITCH | 1 |
| 21 | ESSW | ENGINE START SWITCH ON | 1 |
| 22 | TM1COS | TRACTION MOTOR 1 CUTOUT SWITCH | 1 |
| 23 | TM2COS | TRACTION MOTOR 2 CUTOUT SWITCH | 1 |
| 24 | TM3COS | TRACTION MOTOR 3 CUTOUT SWITCH | 1 |
| 25 | 20T | BRAKE WARNING TRAINLINE | 1 |
| 26 | 22T | TRAINLINE 22 | 1 |
| 27 | HP SELECTION | SELECT HP1 | 1 |
| 28 | HP SELECTION | SELECT HP2 | 1 |
| 29 | HP SELECTION | SELECT HP3 | 1 |
| 30 | GRRS | GROUND RELAY RESET SWITCH | 1 |
| 31 | LTSW | LOAD TEST SWITCH | 1 |
| 32 | ISS | ISOLATION SWITCH | 1 |
| 33 | PTT | PUSHTOTEST | 1 |
| 34 | TM SELECTION | SELECT 4 OR 6 TRACTION MOTORS | 1 |
| 35 | RV1-FOR | REVERSER 1 FORWARD POSITION | 1 |
| 36 | MCO1 | MOTOR CO1 | 1 |
| 37 | B | B CONTACTOR | 1 |
| 38 | P1 | P1 | 1 |
| 39 | RV2-FOR | REVERSER 2 FORWARD POSITION | 1 |
| 40 | MCO2 | MOTOR CO2 | 1 |
| 41 | RV3-FOR | REVERSER 3 FORWARD POSITION | 1 |
| 42 | MCO3 | MOTOR CO3 | 1 |
| 43 | P5 | P5 | 1 |
| 44 | MB2-BRK | MB2 CONTACTOR-BRAKING | 1 |
| 45 | S14 | SERIES CONTACTOR 14 | 1 |
| 46 | MB3-BRK | MB3 CONTACTOR-BRAKING | 1 |
| 47 | P4 | P4 | 1 |
| 48 | P2 | P2 | 1 |
| 49 | MB5-BRK | MB5 CONTACTOR-BRAKING | 1 |
| 50 | P3 | P3 | 1 |
| 51 | RV4-FOR | REVERSER 4 FORWARD POSITION | 1 |
| 52 | MCO4 | MOTOR CO4 | 1 |
| 53 | RV5-FOR | REVERSER 5 FORWARD POSITION | 1 |
| 54 | MCO5 | MOTOR CO5 | 1 |
| 55 | RV6-FOR | REVERSER 6 FORWARD POSITION | 1 |
| 56 | MCO6 | MOTOR CO6 | 1 |
| 57 | GR | GROUND RELAY | 1 |
| 58 | GFC | GENERATOR FIELD CONTACTOR | 1 |
| 59 | MB1-BRK | MB1 CONTACTOR-BRAKING | 1 |
| 60 | S36 | SERIES CONTACTOR 36 | 1 |
| 61 | SB1 | SERIES BRIDGE 1 | 1 |
| 62 | P6 | P6 | 1 |
| 63 | S25 | SERIES CONTACTOR 25 | 1 |
| 64 | P4 | P4 | 1 |
| 65 | GFD | GENERATOR FIELD DECAY CONTACTOR | 1 |
| 66 | LTT1 | LOAD TEST CONTACTOR 1 | 1 |
| 67 | FC1 | FC1 CONTACTOR | 1 |
| 68 | SB2 | SERIES BRIDGE CONTACTOR 2 | 1 |
| 69 | FC2 | FC2 CONTACTOR | 1 |
| 70 | LTT2 | LOAD TEST CONTACTOR 2 | 1 |
| 71 | FC3 | FC3 CONTACTOR | 1 |
| 72 | AC1 | AC1 CONTACTOR | 1 |
| 73 | AC2 | AC2 CONTACTOR | 1 |
| 74 | AC3 | AC3 CONTACTOR | 1 |
| 75 | DC1 | DC1 CONTACTOR | 1 |
| 76 | DC2 | DC2 CONTACTOR | 1 |
| 77 | ECOR | ENGINE COMPUTER ON RELAY | 1 |
| 78 | ECPR | ENGINE COMPUTER POWER RELAY | 1 |
| 79 | PSWR | PUMP SWITCH RELAY | 1 |
| 80 | SCROR | SCR ON RELAY | 1 |
| 81 | TM1 AMPS | 0-1500 AMPS DC | 2 |
| 82 | TM2 AMPS | 0-1500 AMPS DC | 2 |
| 83 | TM3 AMPS | 0-1500 AMPS DC | 2 |
| 84 | TM4 AMPS | 0-1500 AMPS DC | 2 |
| 85 | TM5 AMPS | 0-1500 AMPS DC | 2 |
| 86 | TM6 AMPS | 0-1500 AMPS DC | 2 |
| 87 | TM 1 ARMATURE VOLTS | 0-1500 VDC | 2 |
| 88 | TM 2 ARMATURE VOLTS | 0-1500 VDC | 2 |
| 89 | TM 3 ARMATURE VOLTS | 0-1500 VDC | 2 |
| 90 | TM 4 ARMATURE VOLTS | 0-1500 VDC | 2 |
| 91 | TM 5 ARMATURE VOLTS | 0-1500 VDC | 2 |
| 92 | TM 6 ARMATURE VOLTS | 0-1500 VDC | 2 |
| 93 | GENERATOR VOLTS | 0-1500 VDC | 2 |

TABLE 4-continued

| No. | Name | Description | Bytes |
|---|---|---|---|
| 94 | DYNAMIC BRAKE BLOWER MOTOR AMPS | 0-200 AMPS DC | 2 |
| 95 | 74 VOLT BATTERY VOLTS | 0-100 VDC | 2 |
| 96 | 74 VOLT BATTERY AMPS | 0-200 AMPS DC | 2 |
| 97 | 24 VOLT BATTERY VOLTS | 0-100 VDC | 2 |
| 98 | 24 VOLT BATTERY AMPS | 0-200 AMPS DC | 2 |
| 99 | 24 T VOLTS | 0-100 VDC | 2 |
| 100 | BRAKE CYLINDER AIR PRESSURE | 0-200 PSIG | 2 |
| 101 | MAIN RESERVOIR PRESSURE | 0-200 PSIG | 2 |
| 102 | COMPANION ALTERNATOR VOLTAGE | 0-300 VAC 50 TO 130 HZ | 2 |
| 103 | AMBIENT AIR TEMPERATURE | (−40) TO (+80) CELSIUS | 2 |
| 104 | CONTROL CABINET AIR TEMPERATURE | (−40) TO (+80) CELSIUS | 2 |
| 105 | GENERATOR FIELD VOLTAGE | 0-250 VDC | 2 |
| 106 | A PHASE RTD | −20 +220 C. | 2 |
| 107 | B PHASE RTD | −20 +220 C. | 2 |
| 108 | C PHASE RTD | −20 +220 C. | 2 |
| 109 | DRIVE END BEARING RTD | −20 +220 C. | 2 |
| 110 | FAN END BEARING RTD | −20 +220 C. | 2 |

The GPS location log 632 may store data or information (e.g., longitude, latitude, and optionally elevation) indicative of the location or position of the locomotive 100 (FIG. 1), locomotive platform 106 (FIG. 1), and/or power system 300 (FIG. 3). Such may reflect location or position over time. For example, such information may be sampled periodically (e.g., every minute, hour, etc.) or may be sampled in response to changes of conditions or states (e.g., change in throttle setting). Such may allow the other logged information to be analyzed with respect to location or position, and possibly with respect to elevation. For example, engine operation may be assessed taking into account not only how long the engine was operated at any given RPM, but also accounting for the elevations at which those RPM levels were experienced. This may provide more accurate assessment of engine performance than might otherwise be possible. Such may allow better predictability with respect to when engine maintenance or overhaul is required, allowing longer periods between costly maintenance or overhaul procedures. An example of GPS location logging is illustrated in Table 5, below.

TABLE 5

| Number | Description | Format | Bytes |
|---|---|---|---|
| 1 | Container number | NNNNNNNN | 2 |
| 2 | GPS_UTC_Date | ddmmyy | 2 |
| 3 | GPS_UTC_Time | hhmmss | 2 |
| 4 | GPS_Altitude | meter | 2 |
| 5 | GPS_Latitude | ddmm.mmmm | 2 |
| 6 | GPS_Longitude | dddmm.mmmm | 2 |
| Total | | | 12 |

The off-board or back office portion 606 may include a secure communications interface 634. The secure communications interface 634 may include one or more servers, bridges, routers, and/or firewalls, or other networking or non-networking components (e.g., modem). The secure communications interface 634 allows secure communications to be established with the on-board portion 602 via the communications channel(s) 610.

The off-board or back office portion 606 may include one or more computers or computer systems 636 (only one illustrated). The computers or computer systems 636 may take any of a large variety of processor based forms, for instance, desktop or laptop personnel computers (PCs), workstations, mini-computers, main-frame computers, or even netbooks or tablet type devices, smart phones or Web-enabled personal digital assistants (PDAs). The computers or computer systems 636 will typically include one or more non-transitory computer- or processor-readable medium, and user input/output (I/O) components such as a keyboard, keypad, cursor controller (e.g., mouse, trackball, trackpad), display, graphical user interface (GUI), speaker, vibratory element, etc.

The off-board or back office portion 606 may include a data repository 638 implemented on one or more non-transitory computer- or processor-readable storage mediums. The data repository 638 may take any of a large variety of forms, for example hard disk and associated drives, optical disks and associated drives, etc., suitable for storing what will likely be large amounts of data. The data repository 638 may include one or more databases.

The off-board or back office portion 606 may include reporting and analytics 640. In particular, the one or more computers or computer systems 636 may interact with the data repository 638 to analysis data or information and produce reports and alerts based on such analysis. For example, the computers or computer systems 636 may generate reports regarding engine operation, indicating expected service life before overhaul for a particular engine, based on actual operational parameters (RPM, time, altitude or elevation). Also for example, the computers or computer systems 636 may generate reports regarding idling and/or idle limiting overrides for a given locomotive platform 106 and/or operator. Such may allow refinements to training on a companywide or even on an individual basis. Also for example, the computers or computer systems 636 may generate reports regarding general operation of the locomotive. For instance, reports may be generated indicating a location of each stop made by the locomotive, the date and time the locomotive stopped, the date and time the locomotive left, and/or the duration of the stop. Such may be useful in tracking timely delivery of railcars to customers or other locations. Also for example, the computers or computer systems 636 may generate reports regarding alarms that occurred during operation. For instance, reports may indicate occurrences of excessive speeds, excessive braking, out of range conditions such as excessive temperatures, currents or voltages, ground faults, cutouts of traction motors, etc.

The telematic system 600 serves as a single point portal to provide enhanced information to various entities including the owner, lessee, lessor, or OEM of the locomotive, OEM of the engine, OEM of the electric machine, an entity which retro-fitted the locomotive, an entity obligated with maintenance of the locomotive, various regulatory agencies, etc.

Such may provide remote access to control the system, allow observation to improve diagnostic capabilities, perform system diagnostics, maintenance and general data and/or instructions transfer (e.g., bi-directional). Such may improve customer service and support. Such may allow tracking or accurate modeling of emissions. Such may provide access to the control subsystem, even directly to the ECU, with appropriate security such as authentication and encryption. Such may allow module or container performance to be observed and improve diagnostic capabilities. Such may also provide access to technical information via a technical library, as well as documentation of actual operational characteristics and performance. Such may allow product credibility and commissioning testing. The telematic system 600 may receive information from the engine control unit (ECU) and/or from various sensors distributed about the locomotive platform 102.

Log files may be periodically transferred from locomotives to the off-board or back office portion 606, particularly where there is suitable communications coverage. One or more components of the system may monitor signal strength, determining when signal strength is sufficient to allow the transfer of the log files. The communications should be secure, employing various levels of authentication and/or encryption, as well as firewalls. A transfer log may be maintained to audit the transfers of information between the on-board portion 602 and the off-board or back office portion 606.

Figure 7:
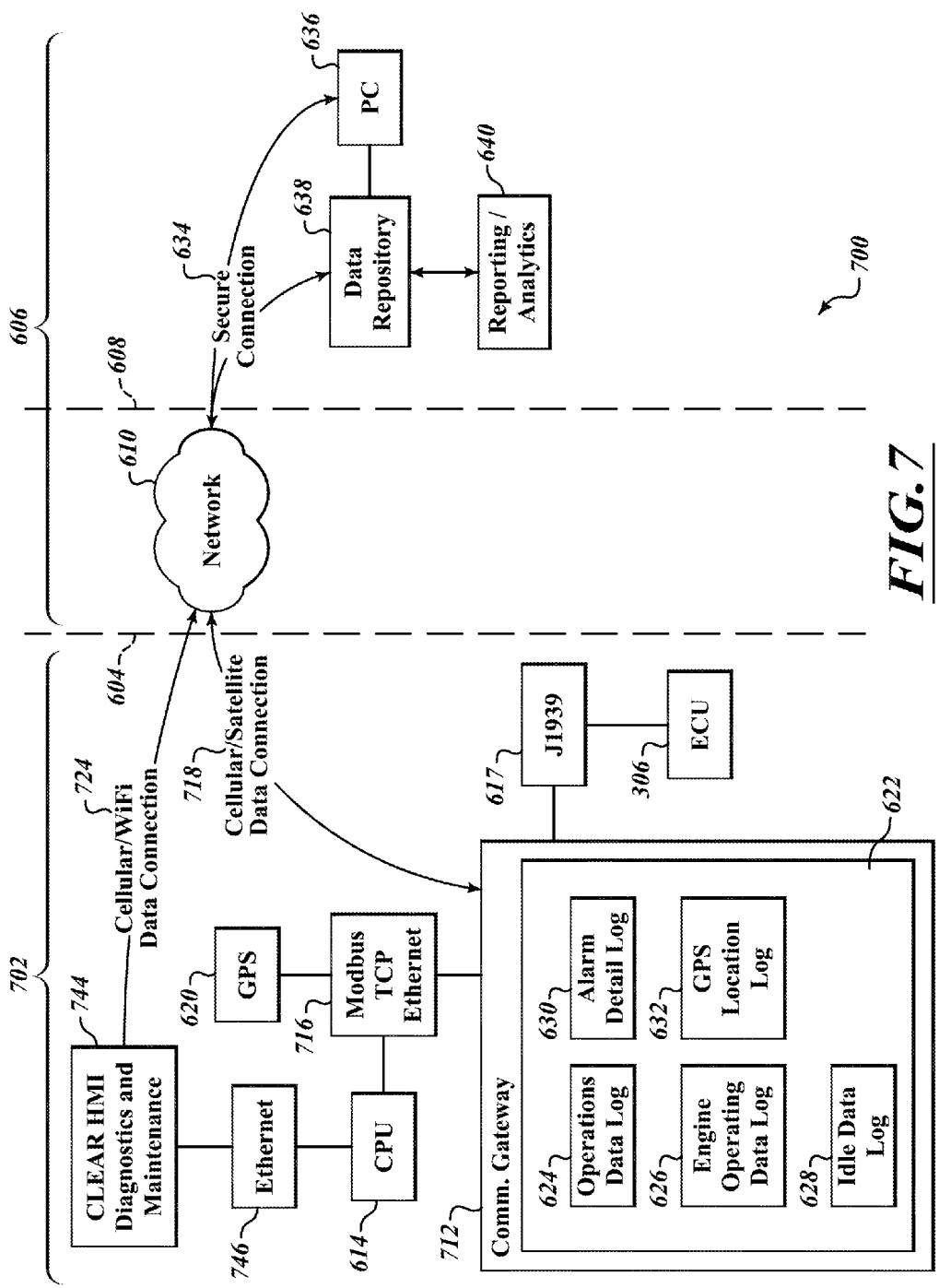
FIG. 7 is a schematic diagram showing a telematics system including components mounted on the locomotive communicatively coupled with back office components, according to another non-limiting illustrated embodiment.

FIG. 7 shows a telematic system 700, according to one illustrated embodiment. The telematic system 700 may be particularly suitable for use with a locomotive, so is described in the context of such. It is appreciated that the telematic system 700 may have uses in other non-locomotive related environments. Components that are identical or similar to those discussed with reference to FIG. 6 are referenced using the same reference numbers used in FIG. 6. In the interest of conciseness, only significant differences are discussed below.

The on-board portion 702 includes a communications gateway 712. The communications gateway 712 can take any of a large variety of forms suitable for providing communications 718 between the various components of the on-board portion 702 and the off-board or back office portion 606. The communications gateway 712 may include a cellular communications unit and/or satellite communications unit which allow data or other information to be transferred between the on-board and the off-board portions 702, 606, respectively. The cellular communications unit and/or satellite communications unit will typically include one or more transceivers and antenna(s) suitable for cellular and satellite communications, respectively, using any conventional cellular and/or satellite communications frequency ranges and protocols. Many suitable cellular communications units and satellite communications units are commercially available. In some instances, data or information may need to be buffered or otherwise retained or stored while cellular coverage is unavailable (e.g., passing through a tunnel, mountains or rural locations). Transfer of information may occur when cellular communications are re-established.

The communications gateway 712 may include one or more ports, connectors or couplers to provide wired or optical signal paths to the various components of the on-board portion 702. The communications gateway 712 may include one or more bridges or routers suitable to handle network traffic including switched packet type communications protocols (TCP/IP), Ethernet or other networking protocols, as well as proprietary protocols employed by various proprietary engine control units (ECUs).

The on-board portion 702 may employ a network connection to provide communications between the communications gateway and the controller, for example a TCP Ethernet or other data connection 716. Various other components of the power system 330 (FIG. 3) may employ TCP Ethernet or other data connections to communicate with the controller 614 and/or communications gateway 712. On-board communications between various components may be implemented in a modular fashion, with communications modules distributed throughout the power system 330 (FIG. 3), module or containers 104 (FIGS. 1 and 2), locomotive platform 106 (FIGS. 1 and 3) or even the entire locomotive 100 (FIG. 1), and/or power system 300 (FIG. 3), and/or locomotive platform 106 (FIGS. 1 and 3). Such may be advantageous relative to point-to-point or "home run" type wiring schemes commonly employed in conventional locomotives.

The on-board portion 702 may include a Human-Machine interface (HMI) 744 to perform diagnostics and maintenance operations. The HMI 744 may take a variety of forms which allow a human to interact with the various components of the power system 300 (FIG. 3), locomotive platform 106 (FIGS. 1 and 3) and/or locomotive 100 (FIG. 1). The HMI 744 may include a user interface portion, for example a touch screen display which implements a graphical user interface (GUI). The GUI may include various user selectable icons, text, and/or graphics, for example one or more charts or graphs representing various operation characteristics. The HMI 744 may include other user interface components, for example keyboard, keypad, or pointer control device (e.g., mouse, trackball, trackpad). The HMI 744 may or may not include a dedicated controller.

The HMI 744 may be communicatively coupled to the controller 614, for example via a network connection, for instance an Ethernet connection 746.

In some embodiments, the HMI 744 provides wireless communications with one or more components of the off-board or back office portion 606 via one or more wireless communications channels 748, allowing remote operation. While illustrated to the left of line 604, the wireless communications channel(s) 748 is typically not part of the on-board portion 604, but rather exists between the on-board and the off-board portions 702, 606, respectively. The cellular communications unit(s) and/or Wi-Fi communications unit(s) will typically include one or more transceivers and antennas suitable for cellular and Wi-Fi communications, respectively, using any conventional cellular and/or Wi-Fi communications frequency ranges and protocols (e.g., 802.11). Many suitable cellular communications units and Wi-Fi communications units are commercially available. In some instances, data or information may need to be buffered or otherwise retained or stored while cellular or Wi-Fi coverage is unavailable (e.g., passing through a tunnel, mountains or rural locations). Transfer of information may occur when communications is re-established.

Figure 8:
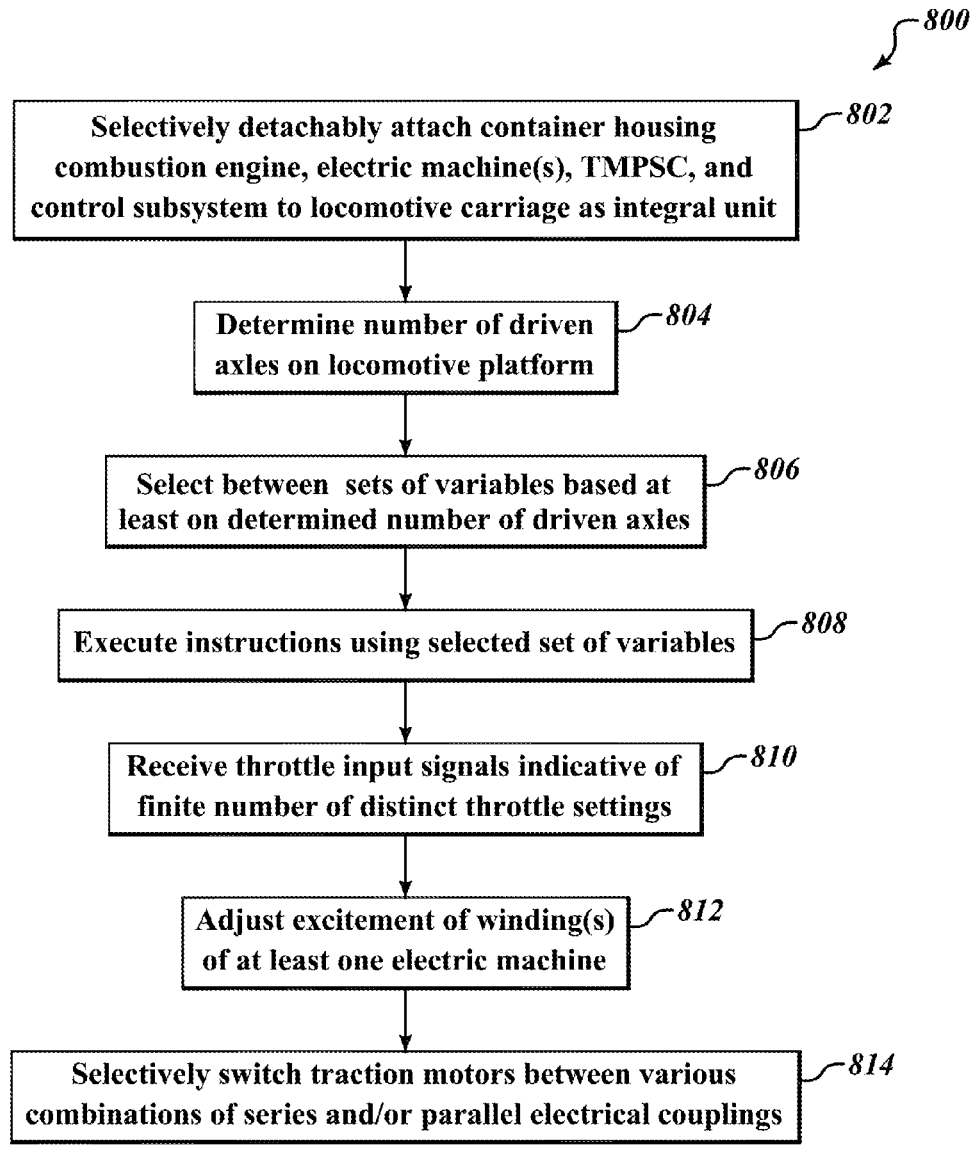
FIG. 8 is a flow diagram showing a high level method of configuring and operating a locomotive platform with the power system of FIGS. 1-5, according to one non-limiting illustrated embodiment.

FIG. 8 shows a high level method 800 of configuring and operating a locomotive platform with the power system of FIGS. 1-5, according to one non-limiting illustrated embodiment.

At 802, one or more modules or containers housing one or more engines, electric machines, traction motor power switching components, and control subsystems are selectively attached as integral unit to locomotive base, carriage or platform. Such may be mounted via any known securement mechanism, fixture or fastener structure. The modules or containers may be detachably mounted, such that the modules or containers may be removed without destroying or damaging the locomotive base, carriage or platform or the modules or containers. The traction motor power switching components (e.g., switch gear) selects between motoring/driving and dynamic braking modes of operation. The switch gear may also configure the traction motors in various combinations of series and parallel electrical couplings.

At 804, a control subsystem on a locomotive (i.e., on-board portion) determines the total number of driven axles on locomotive platform. As explained in more detail below, the control subsystem may rely on user input and/or sensed electrical characteristics to assess the number of driven axles.

At 806, the control subsystem selects between a number of sets of values for various variables or parameters based at least on a determined number of driven axles. The sets of values may be stored in a logic table and reflect characteristics of specific locomotive platforms, which are instrumental or useful in controlling the operation of the locomotive platform. The values could be stored in the back office system and downloaded to the control system. Thus, a first set may be selected for a first type of locomotive platform manufactured by a first OEM and having a first number of driven axles. A second set may be selected for a second type of locomotive platform manufactured by the first OEM and having a second number of driven axles. A third set may be selected for a third type of locomotive platform manufactured by a second OEM and having either the first or the second number of driven axles.

At 808, the control subsystem executes a set of instructions using the selected set of variables. The instructions may be identical for controlling two or more different types of locomotives, the instructions being dynamically configured via selection and use of the correct set of values for the parameters or variables in the instructions.

At 810, the control subsystem receives throttle input signals indicative of a finite number of distinct throttle settings. The control subsystem may intercept or listen to signals from the ECU, which is part of the locomotive platform. The control subsystem may also receive other instructions, for instance instructions related to the setting of the dynamic braking.

At 812, the control subsystem adjusts excitement of winding(s) of at least one electric machine. For example, the control subsystem may send signals to a field current regulator and/or field current alternator to adjust excitation of the windings. Such may be used to increase the available horsepower available from the generated electrical power, without having to increase RPM of the engine. This may produce significant fuel savings, reducing pollution as well as prolonging the useful life of the engine between rebuilds.

At 814, the control subsystem selectively switches traction motors between various combinations of series and/or parallel electrical couplings. The control subsystem may send control signals to control various elements (e.g., contactors, relays) of the traction motor power switching components. For example, when starting from a standstill, the controller may cause the traction motor power switching components to electrically couple all of the traction motors electrically in series to provide high current to achieve high or large amounts of torque. As speed increases, the controller may cause the traction motor power switching components to progressively electrically couple the traction motors electrically in parallel, increasing the voltage, eventually ending with each of the traction motors electrically coupled across the output of the electric machine in parallel. Likewise, as speed decreases, some or all of the tractions motors may be electrically coupled back into series relationships.

Figure 9:
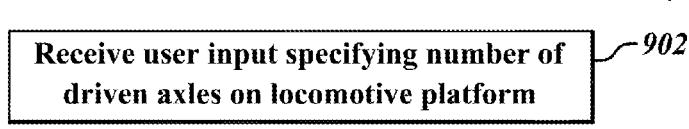
FIG. 9 is a flow diagram showing a method of identifying a number of driven axles on the locomotive platform, according to one non-limiting illustrated embodiment.

FIG. 9 shows a method 900 of identifying a number of driven axles on the locomotive platform, according to one non-limiting illustrated embodiment. The method 900 may, for example, be useful in performing the determination of the number of driven axles 806, of the method 800 (FIG. 8).

At 902, the control subsystem receives user input specifying number of driven axles on locomotive platform. User input may be received from any of a variety of user interfaces, for example via an HMI 744 (FIG. 7). Also for example, user input may be received remotely via a network or non-networked communications link or channel.

Figure 10:
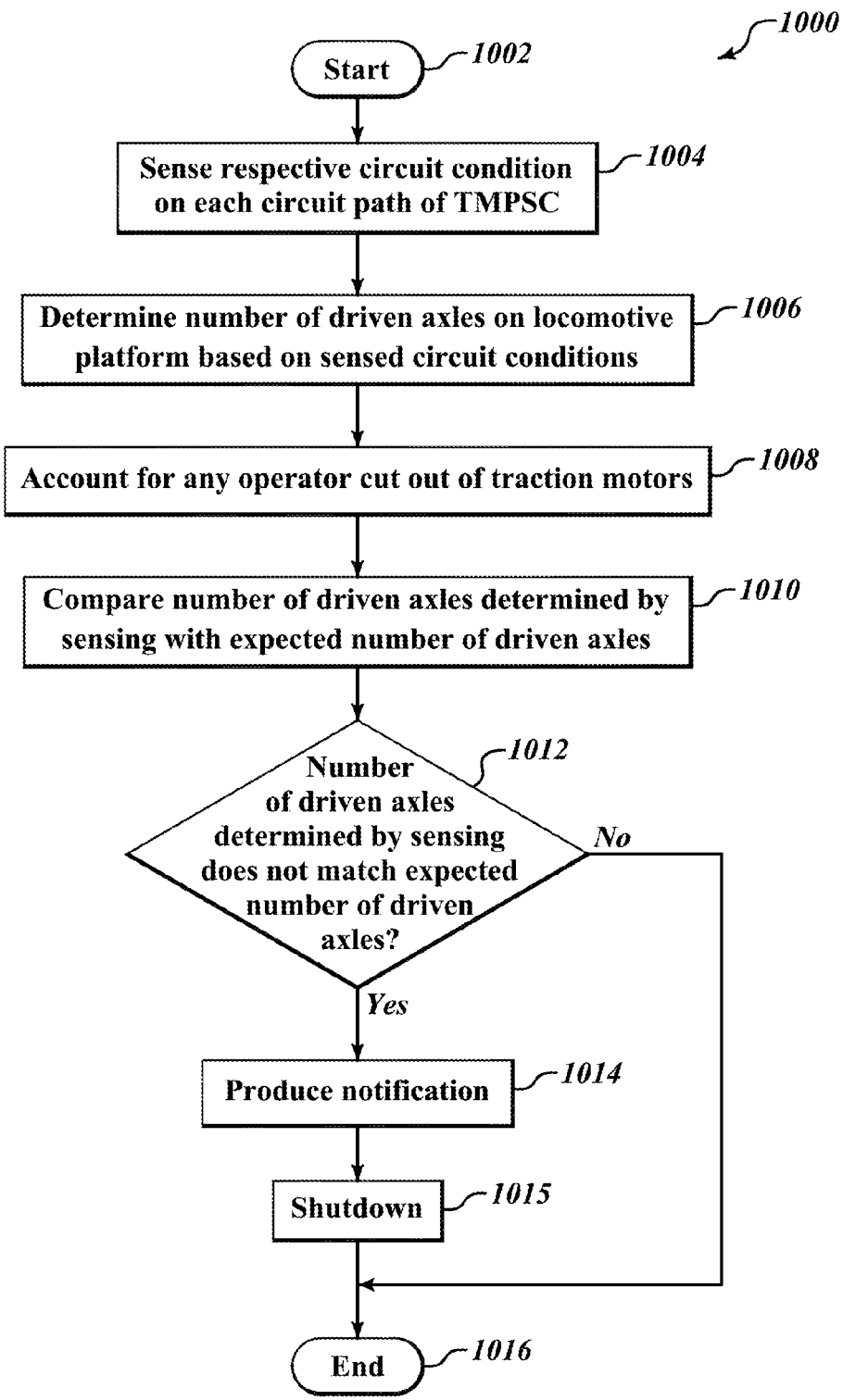
FIG. 10 is a flow diagram showing a method of determining and verifying a number of driven axles on the locomotive platform using an on-board control subsystem, according to one non-limiting illustrated embodiment.

FIG. 10 shows a method 1000 of determining and verifying a number of driven axles on the locomotive platform using an on-board control subsystem, according to one non-limiting illustrated embodiment. The method 1000 may, for example, be useful in performing the determination of the number of driven axles 806, of the method 800 (FIG. 8).

The method 1000 starts at 1002, for example in response to application of power to the control subsystem, activation of a switch or key, or in response to a call from another program or routine.

At 1004, a control subsystem on a locomotive (i.e., on-board portion) senses respective circuit condition on each circuit path of traction motor power switching components. For example, the traction motor power switching components is configured to handle the maximum number of driven axles that are likely to be encountered, for instance six driven axles. The control subsystem may cause power to be applied through the various paths associated with each possible driven axle or traction motor. The control subsystem may sense open circuit conditions where there are no traction motors, thereby providing an indication of the total number of sensed driven axles on the locomotive platform.

At 1006, the control subsystem determines a total number of driven axles on the locomotive platform based at least in part on the sensed circuit conditions. For example, the control subsystem may determine the total number of driven axles by subtracting the number of open circuit conditions sensed from the total number of axle or traction motor drive circuit paths.

At 1008, the control subsystem accounts for any operator cut out of traction motors or driven axles. Operators can selectively cut out driven axles or traction motors. The control subsystem may ascertain that such a cut out has not be triggered, and if triggered may increase the number of driven axles or traction motors sensed by the number of driven axles or traction motors cut out. This assures that the correct set of values for the variables and parameters are selected.

At 1010, the control subsystem compares the total number of driven axles determined by sensing with an expected number of driven axles for the locomotive platform. As described above, a total number can be determined by electrically sensing the presence or absence of driven axles or traction motors across portions of the traction motor power switching components. The expected number can be the number identified by an operator, the owner, OEM or other entity.

At 1012, the control subsystem determines whether the total number of driven axles determined by sensing matches the expected number of driven axles or traction motors.

If the total number of driven axles determined by sensing does not match the expected number of driven axles, then the control subsystem produces an appropriate notification 1014. For example, the control subsystem may cause a message to appear on a visual indicator (e.g., display, light) and/or an aural indicator (e.g., speaker, buzzer) in the cab 112 (FIG. 1) of the locomotive 100. Additionally, or alternatively, the control subsystem may cause a message (e.g., SMS, email) to be sent electronically from the locomotive 100 to the back office system which could perform additional processing and/or alerting. Optionally, the system shuts down or otherwise prevents operation of the locomotive at 1015.

The method 1000 ends or terminates at 1016. While the method 1000 may terminate until called again, in some embodiments the method 1000 may be executed as a parallel thread to one or more other processes implementing one or more of the other methods described herein.

Figure 11:
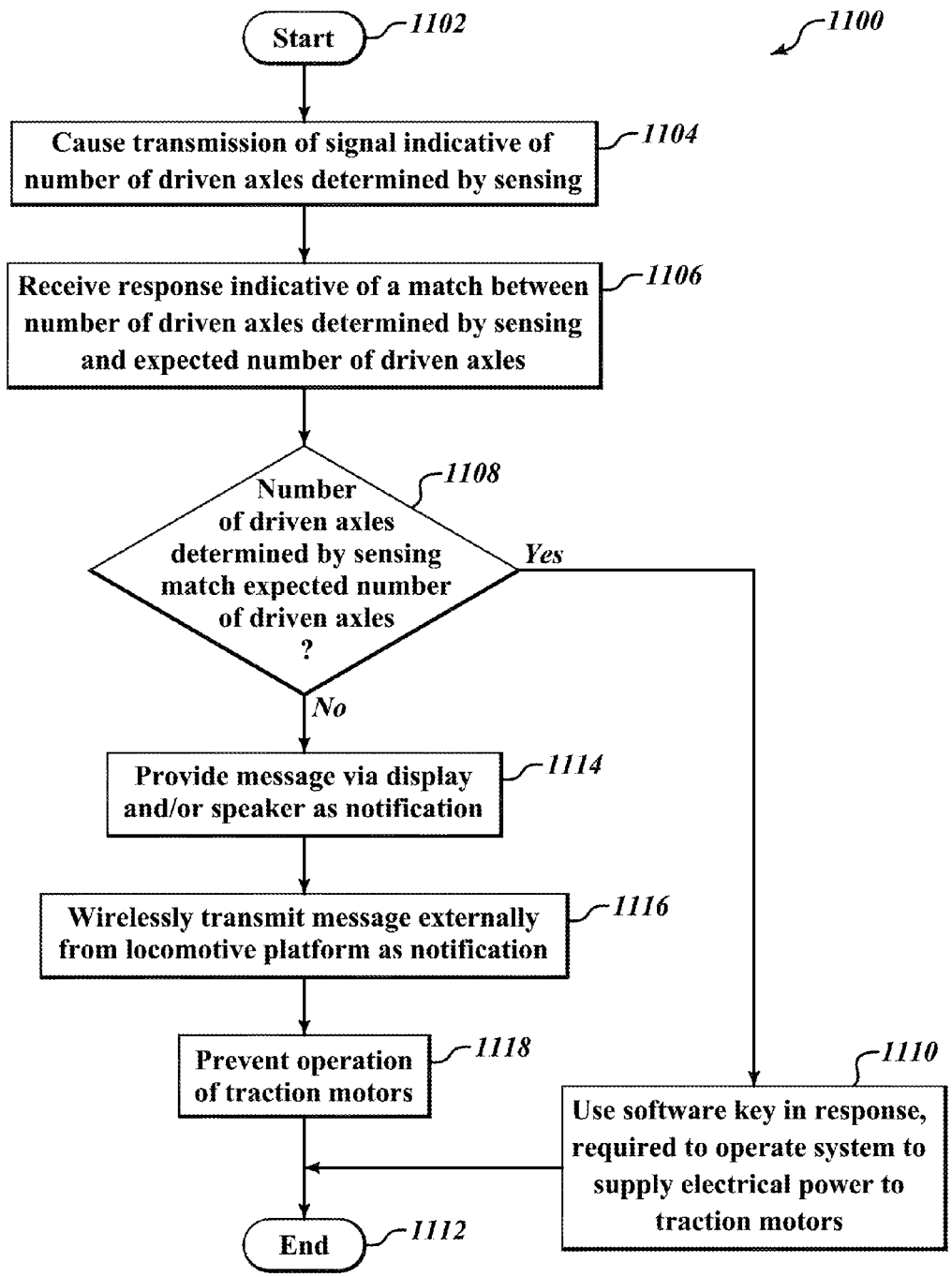
FIG. 11 is a flow diagram showing a method of verifying a number of driven axles on the locomotive platform using a remotely located system, according to one non-limiting illustrated embodiment.

FIG. 11 shows a method 1100 of determining and verifying a number of driven axles on the locomotive platform using a remotely located system, according to one non-limiting illustrated embodiment. The method 1100 may, for example, be useful in performing the determination of the number of driven axles 806 of the method 800 (FIG. 8).

The method 1100 starts at 1102, for example in response to application of power to the control subsystem, activation of a switch or key, or in response to a call from another program or routine.

At 1104, a control subsystem on a locomotive (i.e., on-board portion) causes transmission of signals indicative of the total number of driven axles determined by sensing. As noted above, the control subsystem may sense open circuit conditions where there are no traction motors, thereby providing an indication of the total number of sensed driven axles on the locomotive platform. The control subsystem accounts for any operator cut out of traction motors or driven axles. In particular, the signals may be sent to an off-board or back office system, using a one or more wireless communications components.

At 1106, the control subsystem receives a response, the response indicative of whether there is a match between the total number of driven axles determined by sensing and an expected number of driven axles for the locomotive platform. The response may be received from one or more of the components of the off-board or back office system, using a one or more wireless communications components. The response may include a software key, required to operate or fully operate the control subsystem to supply electrical power to the traction motors.

At 1108, the controller subsystem determines whether the number of driven axles determined by sensing matches an expected number of driven axles or traction motors.

If the number of driven axles determined by sensing matches an expected number of driven axles or traction motors, the control subsystem uses a software key provided with the received response at 1110. The software key may, for example, be required for the control system 330 to supply electrical power to traction motors, at least at full rated power.

The method 1100 may then end or terminate at 1112. While the method 1100 may terminate until called again, in some embodiments the method 1100 may be executed as a parallel thread to one or more other processes implementing one or more of the other methods described herein.

If the number of driven axles determined by sensing does not match an expected number of driven axles or traction motors, the control subsystem may cause a message to be provided via a visual and/or or aural indicator in the cab 112 (FIG. 1) of the locomotive 100 at 1114. The message may indicate the existence of a mismatch.

Additionally, or alternatively, the control subsystem may cause a message to be wirelessly transmitted externally from the locomotive 100. Again, the message may indicate the existence of a mismatch.

At 1118, the control subsystem prevents operation of traction motors or limits operation to safe speeds. The control subsystem can send signals to the gear switch to implement such. Notably, no software key is received if a mismatch is detected, thereby preventing operation of at least the traction motors, or limiting operation to some reduced or limited power level. The reduced or limited power level may be that required to operate at a reduced speed, for example allowing the locomotive to be moved to a safe location in a generally safe manner. Such may be referred to as a "limp home" mode. The method may then end or terminate at 1112. Additionally, or alternatively, the control subsystem may cause a message (e.g., SMS, email) to be sent electronically from the locomotive 100 to the back office system which could perform additional processing and/or alerting.

Figure 12:
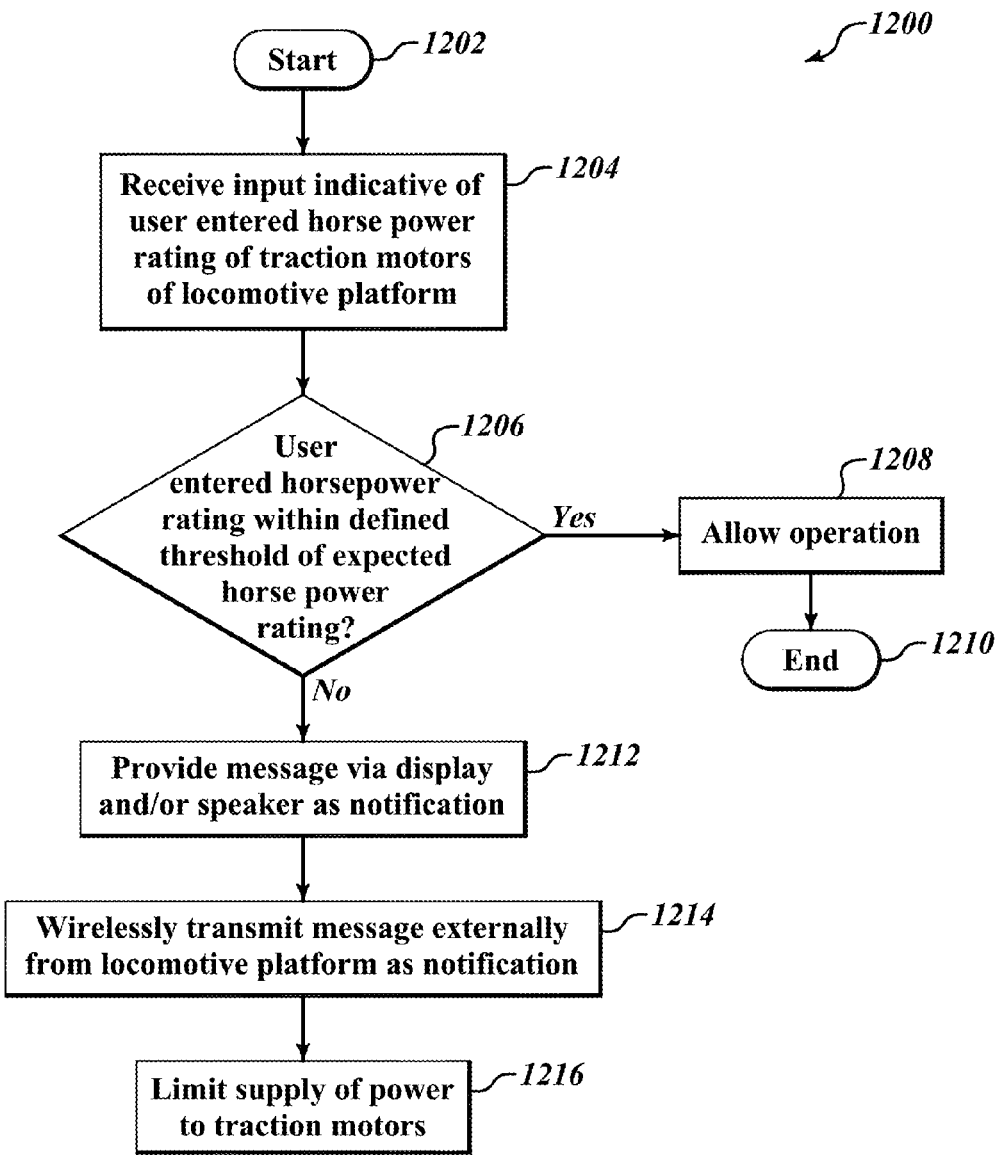
FIG. 12 is a flow diagram showing a method of determining and verifying a horse power rating for the locomotive platform using an on-board control system, according to one non-limiting illustrated embodiment.

FIG. 12 shows a method 1200 of determining and verifying a horse power rating for the locomotive platform using an on-board control system, according to one non-limiting illustrated embodiment.

The method 1200 starts at 1202, for example in response to application of power to the control subsystem, activation of a switch or key, or in response to a call from another program or routine.

At 1204, a control subsystem on a locomotive (i.e., on-board portion) receives input indicative of a user-entered horse power rating of traction motors of locomotive platform. A user or operate may enter input via an HMI 744 (FIG. 7) or some other device at the locomotive. Alternatively, a user or operate may enter input via at a device (e.g., computer, computing system) located remotely from the locomotive, for example in an off-board or back office portion of a system.

At 1206, the control subsystem determines whether the user-entered horse power rating is within a defined threshold of an expected horse power rating. The expected horse power rating may be established from an independent source, for example the owner or OEM of the locomotive, or an entity that supplies a retro-fit system or kit being installed on the locomotive platform.

If the control subsystem determines the user-entered horse power rating is within a defined threshold of the expected horse power rating, then the control subsystem allows operation of the traction motors at 1208. The method 1200 may then end or terminate at 1210. While the method 1200 may terminate until called again, in some embodiments the method 1200 may be executed as a parallel thread to one or more other processes implementing one or more of the other methods described herein.

If the control subsystem determines that the user-entered horse power rating is not within a defined threshold of the expected horse power rating, then the control subsystem produces a notification. For example, the control subsystem may cause a notification message to be presented via a visual and/or aural indicator at 1212. Additionally, or alternatively, the control subsystem may cause a notification message to be transmitted externally from the locomotive platform at 1214. Also, the control subsystem limits supply of power to traction motors, via control of the traction motor power switching components unit(s), at 1214. The control subsystem may completely limit the supply of power to the traction motors, completely preventing operation. Alternatively, the control subsystem may limit the supply of power to the traction motors, allowing operation at some relatively low speed (e.g., "limp home" mode), for example allowing the locomotive to be removed to safe area. The method 1200 may then end or terminate at 1216.

Figure 13:
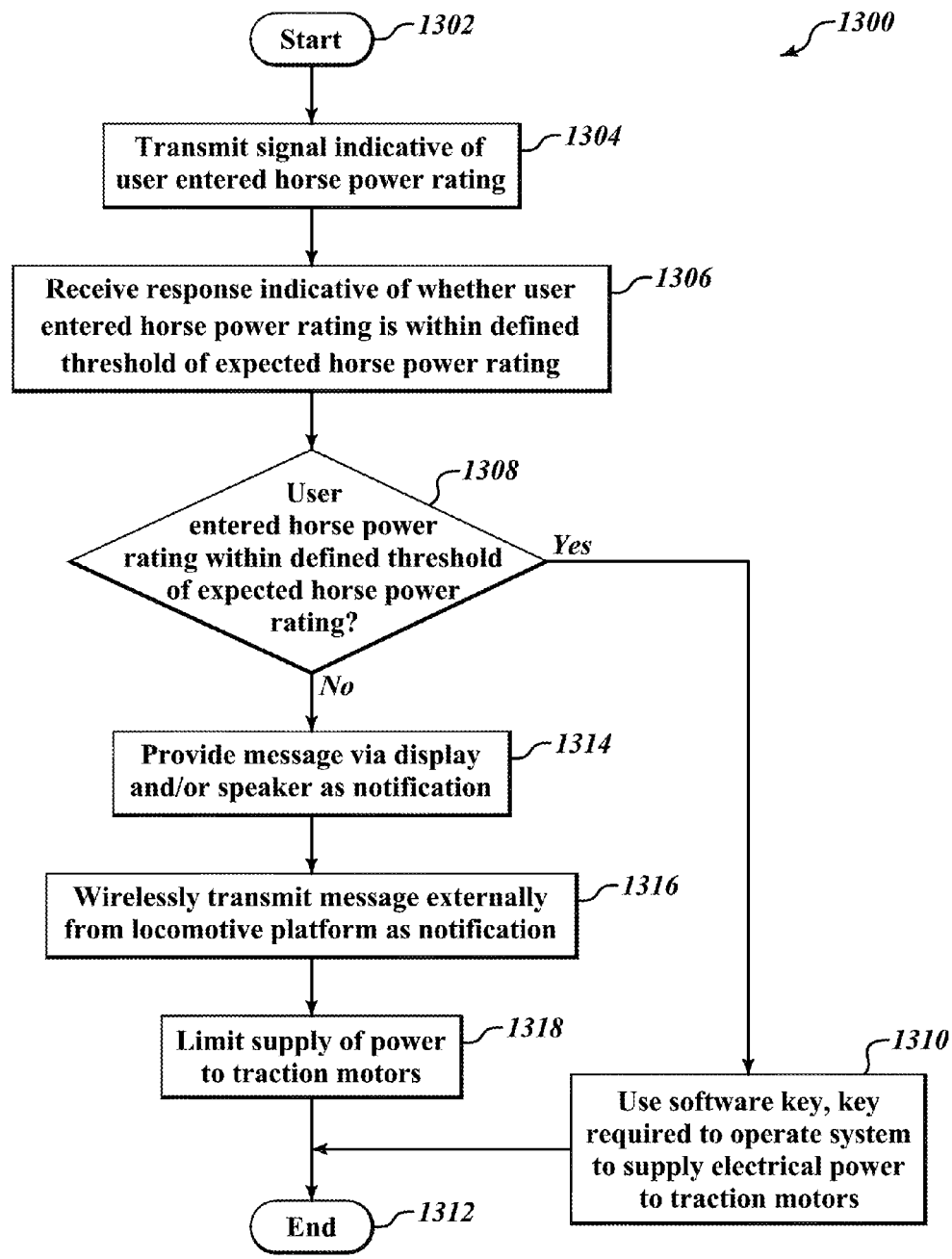
FIG. 13 is a flow diagram showing a method of verifying a horse power rating for the locomotive platform using a remotely located system, according to one non-limiting illustrated embodiment.

FIG. 13 shows a method 1300 of verifying a horse power rating for the locomotive platform using a remotely located subsystem, according to one non-limiting illustrated embodiment.

The method 1300 starts at 1302, for example in response to application of power to the control subsystem, activation of a switch or key, or in response to a call from another program or routine.

At 1304, a control subsystem on a locomotive (i.e., on-board portion) causes transmission of signals indicative of a user-entered horse power rating. As noted above, the control subsystem may receive such via an HMI or other input interface or device. In particular, the signals may be sent to an off-board or back office system, using a one or more wireless communications components.

At 1306, the control subsystem receives a response indicative of whether the user-entered horse power rating is within a defined threshold of the expected horse power rating. The response may be received from one or more of the components of the off-board or back office system, using a one or more wireless communications components. The response may include a software key required to operate, or fully operate, the control subsystem to supply electrical power to the traction motors.

At 1308, the control system determines from the received response whether the user-entered horse power rating is within the defined threshold of the expected horse power rating.

If the user-entered horse power rating is within the defined threshold of the expected horse power rating, the control subsystem allows full operation of the traction motors 1310. Again, such may be implemented via a software key received with the response.

The method 1300 may then end or terminate at 1312. While the method 1300 may terminate until called again, in some embodiments the method 1300 may be executed as a parallel thread to one or more other processes implementing one or more of the other methods described herein.

If the user-entered horse power rating is not within the defined threshold of the expected horse power rating, the control subsystem provides notification. For example, the control subsystem may cause a message to be presented via a visual and/or aural indicator at 1314. Additionally, or alternatively, the control subsystem may cause a message to be transmitted externally from locomotive platform as notification at 1316.

At 1318, the control subsystem supplies limited power to the traction motors via control of the traction motor power switching components unit(s). The supply of power may be so limited as to render the traction motors essentially inoperable. Alternatively, the supply of power may be limited to the extent that the traction motors may be operated at relatively low speeds (e.g., "limp home" mode). The method 1300 may then end or terminate at 1312.

Figure 14:
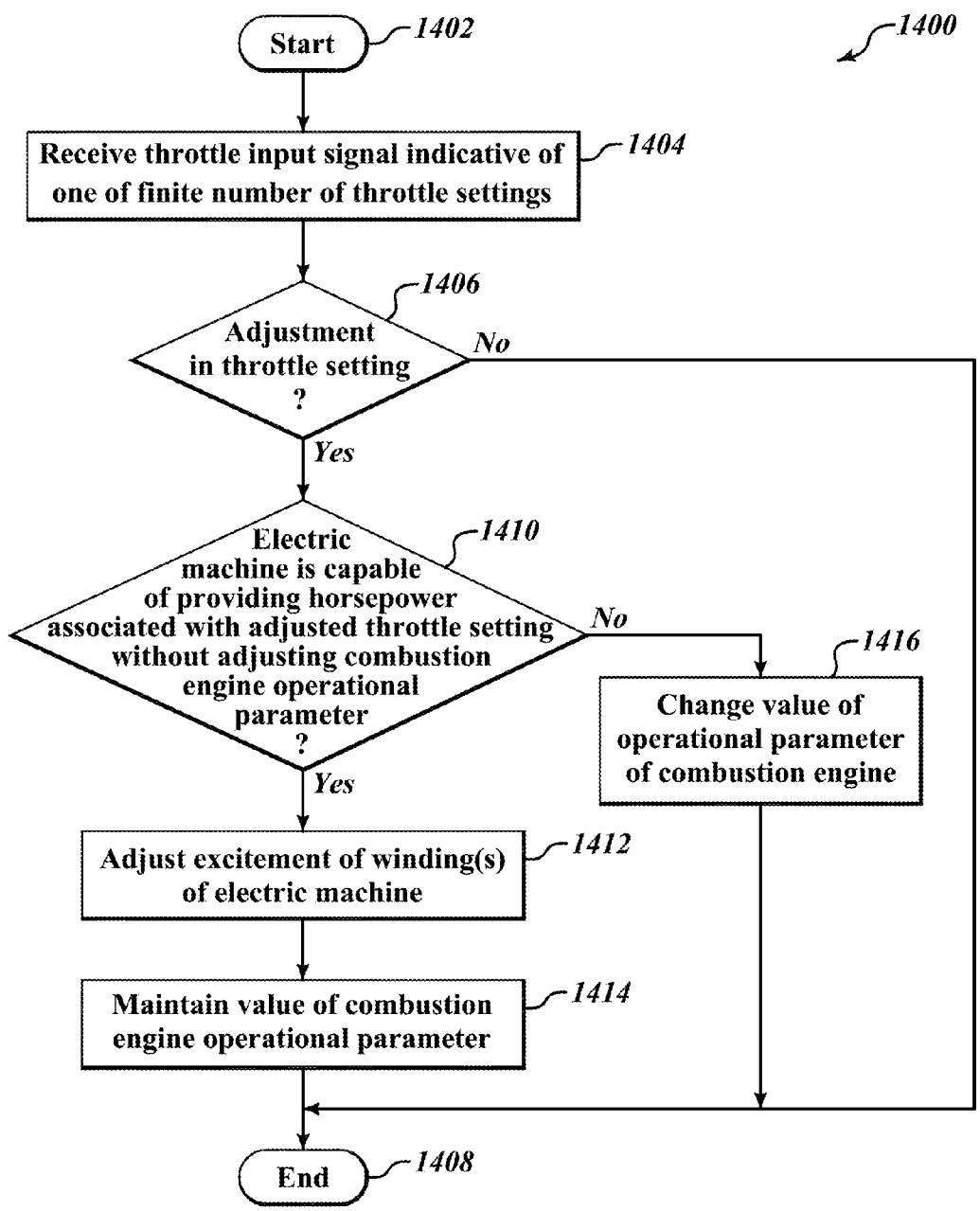
FIG. 14 is a flow diagram showing a low level method of operating a locomotive with the power system of FIGS. 1-5 in accordance with the method illustrated in FIG. 8, according to one non-limiting illustrated embodiment.

FIG. 14 shows a low level method 1400 of operating a locomotive with the power system of FIGS. 1-5 in accordance with the method 800 (FIG. 8), according to one non-limiting illustrated embodiment.

The method 1400 starts at 1402, for example in response to application of power to the control subsystem, activation of a switch or key, or in response to a call from another program or routine.

At 1404, a control subsystem on a locomotive (i.e., on-board portion) receives throttle input signal indicative of one of a finite number of throttle settings. The control subsystem may receive the throttle input from the ECU, which is communicatively coupled to the throttle and the dynamic braking controls.

At 1406 the control system determines whether there has been an adjustment in the throttle setting.

If the throttle setting was not adjusted, the method 1400 ends or terminates at 1408. While the method 1400 may terminate until called again, in some embodiments the method 1400 may be executed as a parallel thread to one or more other processes implementing one or more of the other methods described herein.

If the throttle setting was adjusted, at 1410 the control subsystem determines if the electric machine 326 (FIG. 3) is capable of providing horsepower associated with the adjusted throttle setting without adjusting the combustion engine operational parameter.

If the electric machine 326 (FIG. 3) is capable of providing horsepower associated with the adjusted throttle setting without adjusting an operational parameter of the engine 324 (FIG. 3), at 1412 the control system causes the windings or coils 342, 344 (FIG. 3), 500 (FIG. 5A-5B) of the electric machine to be excited to achieved the desired level of power. For example, the windings or coils may be excited via a field current regulator 348 (FIG. 3) and field current alternator 350 (FIG. 3) to produce power to achieve the range of horse power associated with the particular throttle setting. Also, the control system maintains the operational parameters (e.g., rotational speed) of the engine 324 (FIG. 3) at 1414.

If the electric machine 326 (FIG. 3) is not capable of providing the amount of horsepower associated with the adjusted throttle setting without adjusting a value of operational parameters of engine 324, the control subsystem adjusts a value of one or more operational parameters (e.g., rotational speed) of engine at 1416. For example, the control subsystem may supply appropriate control signals to the engine ECU 306 and/or to a subsystem associated with the engine, for example to a fuel supply subsystem or a fuel/air mixture subsystem or component (e.g., valve, manifold, carburetor). The method 1400 may then end or terminate at 1408.

Figure 15:
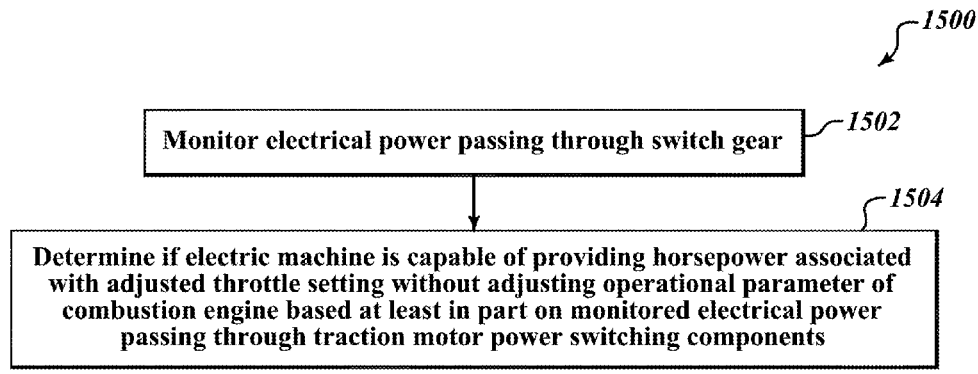
FIG. 15 is a flow diagram showing a method of assessing whether rated horse power may be delivered without changing operation of an engine, according to one non-limiting illustrated embodiment.

FIG. 15 shows a method 1500 of assessing whether a rated horse power may be delivered without changing operation of an engine, according to one non-limiting illustrated embodiment.

At 1502, a control subsystem on a locomotive (i.e., on-board portion) monitors electrical power passing through traction motor power switching components.

At 1504, a control subsystem determines if an electric machine is capable of providing horsepower associated with an adjusted throttle setting without adjusting an operational parameter of a combustion engine based at least in part on a monitored electrical power passing through traction motor power switching components.

Figure 16:
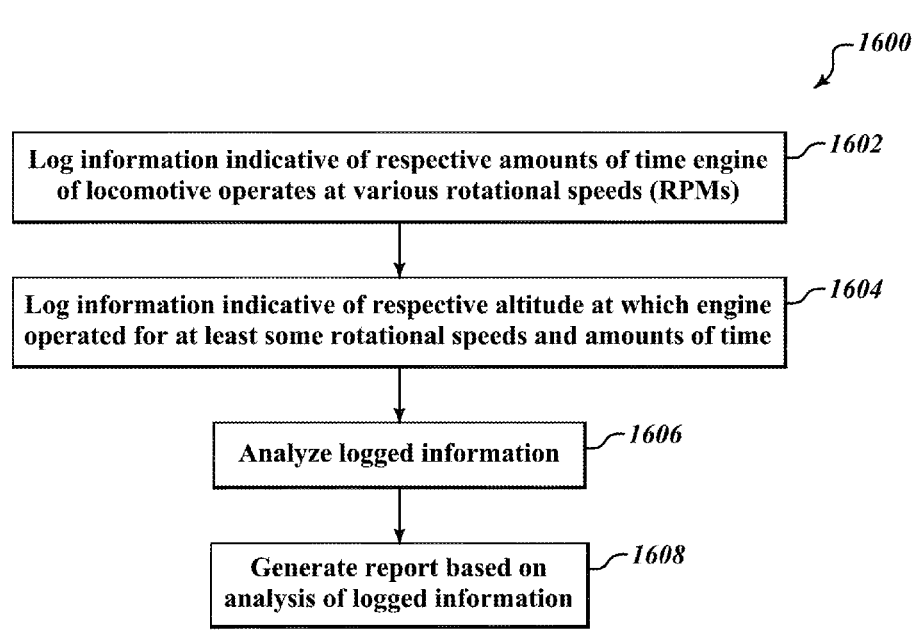
FIG. 16 is a flow diagram showing a method of operating a telematics system to log information related to locomotive and engine operation, according to another non-limiting illustrated embodiment.

FIG. 16 shows a method 1600 of operating a telematics system to log information related to engine operation, according to another non-limiting illustrated embodiment.

At 1602, a control subsystem on a locomotive (i.e., on-board portion) logs information indicative of respective amounts of time an engine of a locomotive operates at various operational modes.

At 1604, the control subsystem logs information indicative of a respective geographical location and altitude or elevation at which the engine operated for at least some amounts of time.

At 1606, a computer or computer system not on the locomotive (i.e., off-board or back office portion) analyzes and/or correlates the logged information.

At 1608, the computer or computer system of the off-board or back office portion generates one or more reports based on the analysis of the logged information.

As noted above, the telematics system may log information periodically or in response to events or conditions (i.e., change of states), such as changes of throttle position. Logging based on changes of state may provide an advantageous use of computing and/or communications resources.

Figure 17:
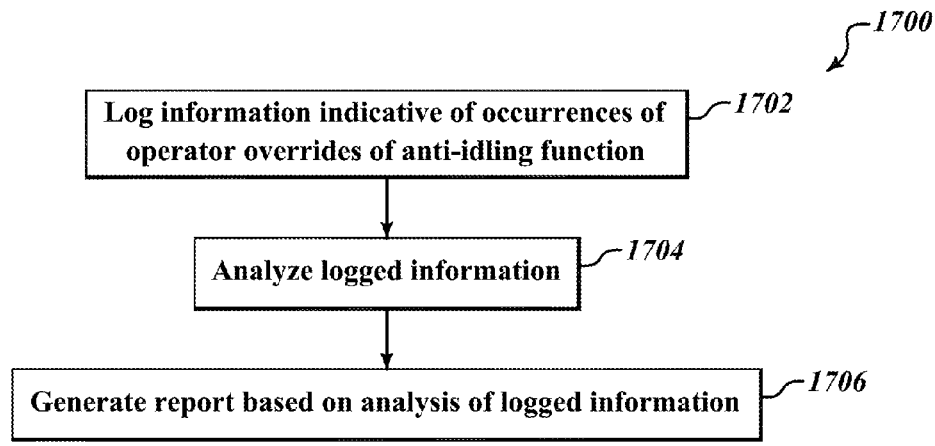
FIG. 17 is a flow diagram showing a method of operating a telematics system to log information related to overrides of an idle limiting function, according to one non-limiting illustrated embodiment.

FIG. 17 shows a method 1700 of operating a telematics system to log information related to overrides of an anti-idling function, according to one non-limiting illustrated embodiment.

At 1702, a control subsystem on a locomotive (i.e., on-board portion) logs information indicative of occurrences of operator overrides of anti-idling function.

At 1704, a computer or computer system not on the locomotive (i.e., off-board or back office portion) analyzes the logged information.

At 1706, the computer or computer system of the off-board or back office portion generates one or more reports based on the analysis of the logged information.

Figure 18:
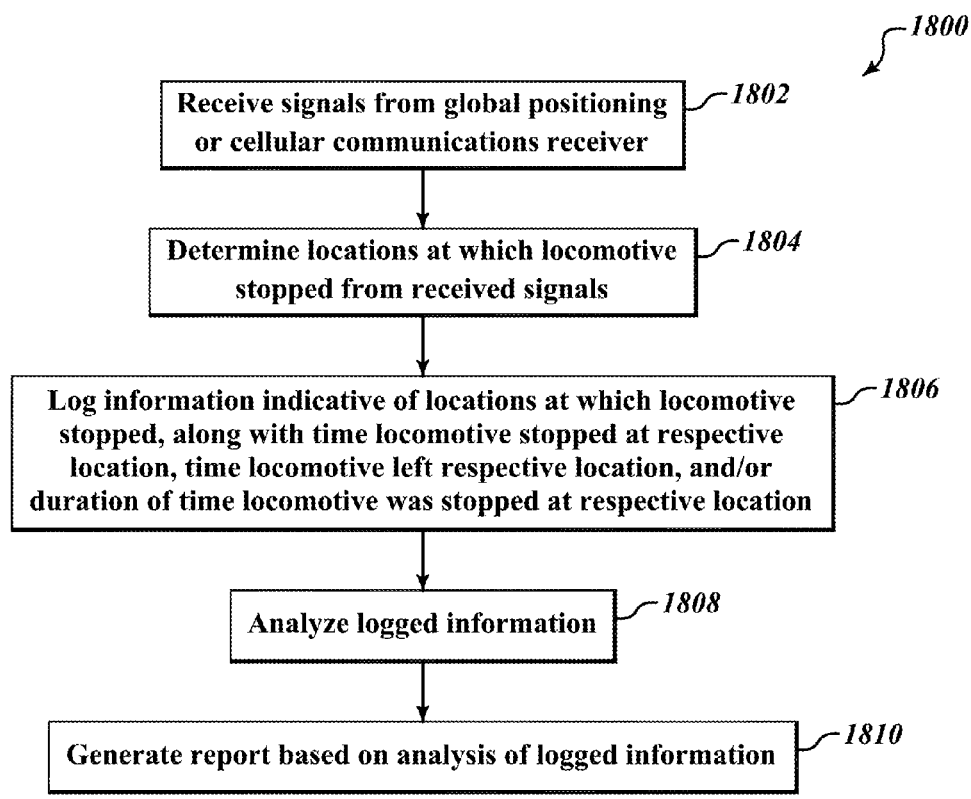
FIG. 18 is a flow diagram showing a method of operating a telematics system to log information related to location and/or elevation, according to another non-limiting illustrated embodiment.

FIG. 18 shows a method 1800 of operating a telematics system to log information related to location and/or elevation, according to another non-limiting illustrated embodiment.

At 1802, a control subsystem on a locomotive (i.e., on-board portion) receive signals from a global positioning or cellular communications receiver.

At 1804, the control subsystem determines, from received signals, the locations at which the locomotive stopped.

At 1806, the control subsystem logs information indicative of locations at which the locomotive stopped, along with a time the locomotive stopped at each respective location, a time the locomotive left each respective location, and/or a duration of time the locomotive was stopped at each respective location.

At 1808, a computer or computer system not on the locomotive (i.e., off-board or back office portion) analyzes the logged information.

At 1810, a computer or computer system of the off-board or back office portion generates one or more reports based on the analysis of the logged information.

Figure 19:
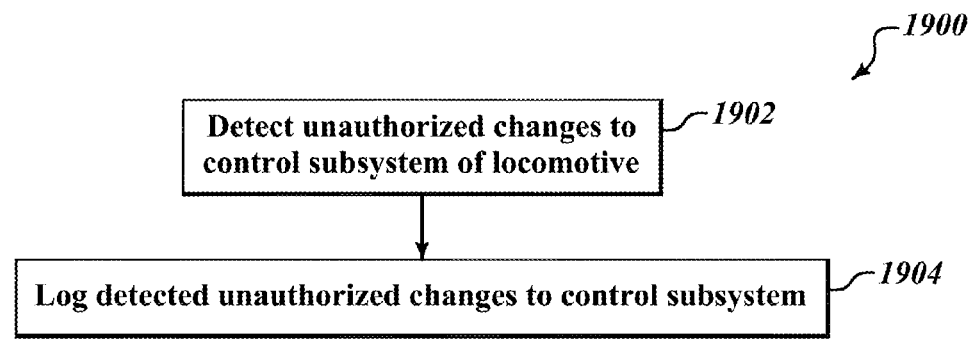
FIG. 19 is a flow diagram showing a method of operating a telematics system to log information related to detection of unauthorized changes, according to another non-limiting illustrated embodiment.

FIG. 19 shows a method 1900 of operating a telematics system to log information related to detection of unauthorized changes, according to another non-limiting illustrated embodiment.

At 1902, a control subsystem on a locomotive (i.e., on-board portion) detects unauthorized changes to a control subsystem of locomotive.

At 1904, the control subsystem logs detected unauthorized changes to the control subsystem.

Figure 20:
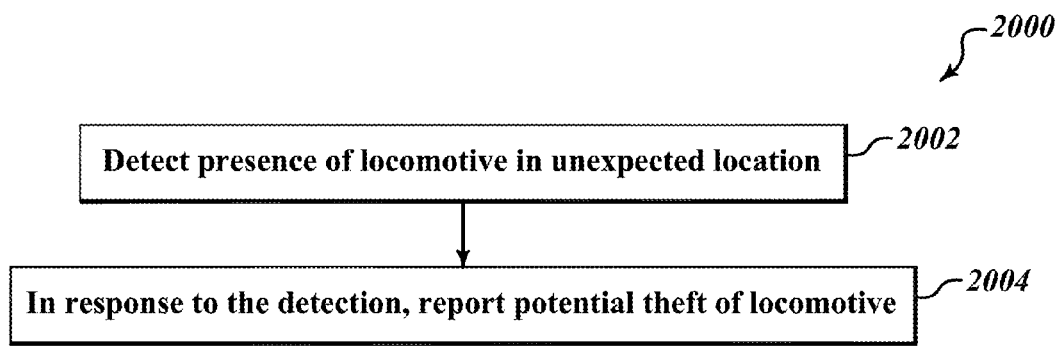
FIG. 20 is a flow diagram showing a method of operating a telematics system to log information related to presence in an unauthorized location, according to one non-limiting illustrated embodiment.

FIG. 20 shows a method 2000 of operating a telematics system to log information related to a presence in an unauthorized location, according to one non-limiting illustrated embodiment.

At 2002, a control subsystem on a locomotive (i.e., on-board portion) detects a presence of locomotive in unauthorized location. The presence in an unexpected or unauthorized location may be indicative of theft of the locomotive or some other abnormal situation.

In response to a detection, the control subsystem reports an unauthorized location of the locomotive at 2004. In particular, the control system causes transmission of a notification message from the locomotive. The signal may include information that specifies a current location of the locomotive, as well as current date and time.

The various methods described herein may include additional acts, omit some acts, and/or may perform the acts in a different order than set out in the various flow diagrams. The use of ordinals such as first, second and third does not necessarily imply a ranked sense of order, but rather may only distinguish between multiple instances of an act or structure.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

While generally discussed in the environment and context of locomotives, the teachings herein can be applied in a wide variety of other environments, including other vehicular as well as non-vehicular environments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other contexts, not necessarily the exemplary context of controlling operations of a retrofitted locomotive generally described above. For example, the power system and/or telematics system may be installed as part of the manufacture of the locomotive by the OEM. Such systems may be supplied by one or more vendors, or may be manufactured by the locomotive OEM.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A system, comprising:
    a combustion engine operable to produce movement, the movement represented by a value of an operational parameter of the combustion engine;
    an electric machine having at least one portion coupled to the combustion engine to be driven in response to the movement produced by the combustion engine and to produce electrical power in response; and
    a control subsystem communicatively coupled to control the combustion engine and the electric machine at least in part in response to a plurality of received throttle input signals that are indicative of a finite number of distinct throttle settings, each of the throttle settings associated with a respective range of available horsepower delivered as electrical power via the electric machine, wherein the control subsystem in response to an adjustment in the throttle setting selectively maintains the value of the operational parameter of the combustion engine where an amount of horsepower associated with the adjusted throttle setting is available without a change in the value of the operational parameter of the combustion engine, and selectively changes the value of the operational parameter of the combustion engine where the amount of horsepower associated with the adjusted throttle setting is not available without the change in the value of the operational parameter of the combustion engine.

2. The system of claim 1 wherein the control subsystem determines if the electric machine is capable of providing the amount of horsepower associated with the adjusted throttle setting without the change in the value of the operational parameter of the combustion engine.

3. The system of claim 2, further comprising:
    a set of traction motor power switching components electrically coupled to the electric machine to receive electrical power therefrom and communicatively coupled to the control subsystem, the set of traction motor power switching components selectively operable at least in part in response to the control subsystem to switch the electrical power.

4. The system of claim 3 wherein the control subsystem monitors the electrical power passing through the traction motor power switching components and determines if the electric machine is capable of providing the amount of horsepower associated with the adjusted throttle setting without the change in the value of the operational parameter of the combustion engine based on the monitored electrical power passing through the traction motor power switching components.

5. The system of claim 2 wherein the control subsystem adjusts an excitement of at least one winding of the electric machine if the electric machine is capable of providing the horsepower associated with the adjusted throttle setting without the change in the value of the operational parameter of the combustion engine.

6. The system of claim 1 wherein the combustion engine is a diesel combustion engine, the operational parameter is rotational speed of a crankshaft of the combustion engine, and the electric machine includes at least one of an alternator or a generator.

7. The system of claim 6 wherein the control subsystem includes at least one processor and at least one non-transitory processor-readable medium that stores instructions and data executable by the processor, the data including a set of values for six driven axles and a set of values for four driven axles, and further comprising:
    a set of traction motor power switching components electrically coupled to the electric machine to receive electrical power therefrom and communicatively coupled to the control subsystem, the set of traction motor power switching components selectively operable at least in part in response to the control subsystem to switch the electrical power to a plurality of fraction motors of a locomotive.

8. A method of operating a system comprising a combustion engine operable to produce movement represented by a value of an operational parameter of the combustion engine, an electric machine having at least one portion coupled to the combustion engine to be driven in response to the movement produced by the combustion engine and to produce electrical power in response, and a control subsystem including at least one processor and at least one non-transitory processor-readable medium that stores instructions and data executable by the processor, the control subsystem communicatively coupled to control the combustion engine and the electric machine, the method comprising:
    receiving by the control subsystem a plurality of throttle input signals that are indicative of a finite number of distinct throttle settings, each of the throttle settings associated with a respective range of available horsepower delivered as electrical power via the electric machine; and
    in response to an adjustment in the throttle setting, selectively maintaining by the control subsystem the value of the operational parameter of the combustion engine where an amount of horsepower associated with the adjusted throttle setting is available without a change in the value of the operational parameter of the combustion engine.

9. The method of claim 8, further comprising:
    in response to the adjustment in the throttle setting, selectively changing by the control subsystem the value of the operational parameter of the combustion engine where the amount of horsepower associated with the adjusted throttle setting is not available without the change in the value of the operational parameter of the combustion engine.

10. The method of claim 8, further comprising
    determining by the control subsystem if the electric machine is capable of providing the amount of horsepower associated with the adjusted throttle setting without the change in the value of the operational parameter of the combustion engine.

11. The method of claim 10 wherein the system further comprises a set of traction motor power switching components electrically coupled to the electric machine to receive electrical power therefrom and communicatively coupled to the control subsystem, the method further comprising:

monitoring by the control subsystem the electrical power passing through the traction motor power switching components and wherein the determining if the electric machine is capable of providing the amount of horsepower associated with the adjusted throttle setting without the change in the value of the operational parameter of the combustion engine is based at least in part on the monitored electrical power passing through the traction motor power switching components.

12. The method of claim 10, further comprising:

adjusting by the control subsystem an excitement of at least one winding of the electric machine if the electric machine is capable of providing the amount of horsepower associated with the adjusted throttle setting without the change in the value of the operational parameter of the combustion engine.

13. The method of claim 8 wherein the combustion engine is a diesel combustion engine, the operational parameter is rotational speed, and adjusting by the control subsystem an excitement of at least one winding of the electric machine includes adjusting an excitement of a winding of at least one of an alternator or a generator.

14. The method of claim 12 wherein the at least one non-transitory processor-readable medium that stores instructions and data executable by the processor, the data including at least a set of values for six driven axles and a set of values for four driven axles, and further comprising:

selecting one of the sets of values based on a number of driven axles on a locomotive; and executing the set of instructions using the selected set of values to power to a plurality of traction motors of the locomotive.

15. A power system for a locomotive having a plurality of traction motors coupled to drive a number of driven axles, the system comprising:

a combustion engine operable to produce rotation of a crank shaft at a plurality of rotational speeds representable in revolutions per minute;

at least one of an alternator or a generator having at least one drive shaft coupled to the crank shaft of the combustion engine to be driven therewith and to produce electrical power in response thereto at an output of the alternator or the generator;

a set of traction motor power switching components electrically coupled to the output of the alternator or the generator and having at least one set of contacts electrically coupled to the traction motors of the locomotive; and a control subsystem communicatively coupled to control the combustion engine, the electric machine, and the fraction motor power switching components at least in part in response to a plurality of received throttle input signals that are indicative of a finite number of distinct throttle settings, each of the throttle settings associated with a respective range of available horsepower delivered as electrical power to the traction motors via the electric machine and fraction motor power switching components, where in response to a selection of a new one of the throttle settings, the control subsystem determines whether at the current rotational speed of the crank shaft the combustion engine electrical power that is generatable is within the respective range of available horsepower for the selected new one of the throttle settings and changes the rotational speed of the crank shaft of the combustion engine only when the available horsepower generatable at the current rotational speed is outside the respective range for the selected new one of the throttle settings.

16. The system of claim 15 wherein the control subsystem adjusts an excitement of at least one winding of the alternator or generator if at the current rotational speed of the crank shaft of the combustion engine electrical power that is generatable is within the respective range of available horsepower for the selected new one of the throttle settings.

17. A power system for a locomotive platform having a plurality of traction motors coupled to drive a number of driven axles, the system comprising:

a combustion engine operable to produce rotation of a crank shaft;

at least one electric machine having at least one drive shaft coupled to the crank shaft of the combustion engine to be driven therewith and to produce electrical power in response thereto at an output of the at least one electric machine;

a set of traction motor power switching components electrically coupled to the output of the electric machine and having at least one set of contacts electrically coupleable to the traction motors of the locomotive platform; and a control subsystem comprising at least one processor and at least one non-transitory processor-readable medium that stores instructions and data executable by the processor, the data including a first set of values to drive a first number of traction motors drivingly coupled to six driven axles and at least a second set of values to drive a second number of traction motors drivingly coupled to four driven axles, the control subsystem communicatively coupled to control the combustion engine, the at least one electric machine, and the traction motor power switching components at least in part in response to a plurality of received throttle input signals that are indicative of a finite number of distinct throttle settings, each of the throttle settings associated with a respective range of available horsepower delivered as electrical power to the traction motors via the at least one electric machine and the traction motor power switching components based at least in part on the number of driven axles of the locomotive platform.

18. The system of claim 17 wherein the control subsystem determines the number of driven axles on the locomotive platform.

19. The system of claim 18 wherein the control subsystem senses a respective circuit condition on each of a number of circuit paths of the traction motor power switching components and determines the number of driven axles on the locomotive platform based at least in part on the sensed circuit conditions.

20. The system of claim 18 wherein the control subsystem compares the number of driven axles determined by sensing with an expected number of driven axles and produces a notification if the number of driven axles determined by sensing does not match the expected number of driven axles.

21. The system of claim 20 wherein the control subsystem accounts for any cut out of traction motors when the control subsystem compares the number of driven axles determined by sensing with the expected number of driven axles.

22. The system of claim 18, further comprising:

an external communications module operable to provide communications externally from the system, wherein the control subsystem causes the external communications module to transmit a signal indicative of the number of driven axles determined by sensing.

23. The system of claim 22 where in response to the transmission of the signal indicative of the number of driven axles determined by sensing, the communications module receives a response indicative of a match between the number of driven axles determined by sensing and the expected number of driven axles and which includes a key required to operate the system to supply electrical power to the traction motors.

24. The system of claim 17 wherein the control subsystem is communicatively coupled to adjust an excitement of at least one winding of the at least one electric machine.

25. The system of claim 17 wherein the combustion engine is a diesel combustion engine, and the electric machine includes at least one of an alternator or a generator.

26. The system of claim 17, further comprising:
a container that houses the combustion engine, the at least one electric machine, the set of traction motor power switching components, and the control subsystem, the container selectively attachable and detachable to the locomotive carriage as an integral unit.

27. The system of claim 26 wherein the container is selectively installable on any of at least two locomotive carriages manufactured by respective original equipment manufacturers and the control system is operable on those respective locomotive carriages without any changes to the instructions via dynamic selection between the first and at least the second sets of variables.

28. The system of claim 26 wherein the container is selectively installable on any of at least two locomotive carriages manufactured by a single original equipment manufacturers and the control system is operable on those respective locomotive carriages without any changes to the instructions.

29. The system of claim 17 wherein the at least one non-transitory processor-readable medium stores a single set of instructions to control at least two different locomotive platforms which are at least one a) manufactured by respective original equipment manufacturers different from one another or b) have a respective number of driven axles different from one another, based on a dynamic selection between the first and at least the second sets of values and without any changes to the instructions.

30. The system of claim 17 wherein the traction motor power switching components is operable to selectively switch ones of the traction motors between series and parallel electrical couplings.

31. A method of operating a power system for a locomotive platform having a plurality of traction motors coupled to drive a number of driven axles, the power system comprising a combustion engine operable to produce rotation of a crank shaft, at least one electric machine having at least one drive shaft coupled to the crank shaft of the combustion engine to be driven therewith and to produce electrical power in response thereto at an output of the at least one electric machine, a set of traction motor power switching components electrically coupled to the output of the electric machine and having at least one set of contacts electrically coupleable to the traction motors of the locomotive platform, and a control subsystem comprising at least one processor and at least one non-transitory processor-readable medium that stores instructions and data executable by the at least one processor, the data including a first set of values to drive a first number of traction motors drivingly coupled to six driven axles and at least a second set of values to drive a second number of traction motors drivingly coupled to four driven axles, the control subsystem communicatively coupled to control the combustion engine, the at least one electric machine, and the traction motor power switching components, the method comprising:
determining by the control subsystem the number of driven axles on the locomotive platform;
selecting by the control subsystem between the first or the at least second set of values based at least on the number of driven axles the locomotive platform is determined to have; and
executing the instructions by the control subsystem with the selected one of the first or at least the second sets of values.

32. The method of claim 31, further comprising:
sensing a respective circuit condition on each of a number of circuit paths of the traction motor power switching components, wherein determining the number of driven axles on the locomotive platform is based at least in part on the sensed circuit conditions.

33. The method of claim 31, further comprising:
comparing the number of driven axles determined by sensing with an expected number of driven axles; and
producing a notification if the number of driven axles determined by sensing does not match the expected number of driven axles.

34. The method of claim 33, further comprising:
accounting for any operator-imposed cut out of traction motors when comparing the number of driven axles determined by sensing with the expected number of driven axles.

35. The method of claim 31, further comprising:
causing an external communications module to transmit a signal indicative of the number of driven axles determined by sensing externally from the locomotive platform.

36. The method of claim 35, further comprising:
in response to transmitting the signal indicative of the number of driven axles determined by sensing, receiving a response indicative of a match between the number of driven axles determined by sensing and the expected number of driven axles and which includes a key required to operate the power system to supply electrical power to the fraction motors.

37. The method of claim 31, further comprising:
adjusting an excitement of at least one winding of the at least one electric machine by the control subsystem.

38. The method of claim 31, further comprising:
selectively detachably attaching a container that houses the combustion engine, the at least one electric machine, the set of traction motor power switching components, and the control subsystem, as an integral unit to the locomotive platform.

39. The method of claim 31, further comprising:
selectively switching ones of the traction motors between series and parallel electrical couplings by the switchgear in response to the control subsystem.

40. The method of claim 31, further comprising:
receiving a plurality of received throttle input signals that are indicative of a finite number of distinct throttle settings by the control subsystem, each of the throttle settings associated with a respective range of available horsepower delivered as electrical power to the traction motors via the at least one electric machine and the traction motor power switching components based at least in part on the number of driven axles which the locomotive platform has.

41. A power system for a locomotive platform having a plurality of traction motors coupled to drive a number of driven axles, the system comprising:
- a combustion engine operable to produce rotation of a crank shaft at a plurality of rotational speeds;
- at least one electric machine having at least one drive shaft coupled to the crank shaft of the combustion engine to be driven therewith and to produce electrical power in response thereto at an output of the electric machine;
- a set of traction motor power switching components electrically coupled to the output of the electric machine and having at least one set of contacts electrically coupled to the traction motors of the locomotive platform; and
- a control subsystem comprising at least one processor and at least one non-transitory processor-readable medium that stores instructions and data executable by the processor, the control subsystem determining the number of driven axles on the locomotive platform based at least in part on a respective circuit condition sensed on each of a number of circuit paths of the fraction motor power switching components.

42. The power system of claim 41 wherein the data includes a first set of values to drive a first number of traction motors drivingly coupled to first number of driven axles and at least a second set of values to drive a second number of traction motors drivingly coupled to a second number of driven axles, the second number of driven axles different than the first number of driven axles, and wherein the control subsystem selects between the first and at least the second set of values based at least in part on the number of driven axles which the locomotive platform is determined to have.

\* \* \* \* \*